(12) United States Patent
Hongu

(10) Patent No.: US 8,135,268 B2
(45) Date of Patent: Mar. 13, 2012

(54) LENS CONTROL APPARATUS, OPTICAL APPARATUS AND LENS CONTROL METHOD

(75) Inventor: Hideyasu Hongu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 12/686,762

(22) Filed: Jan. 13, 2010

(65) Prior Publication Data

US 2010/0178045 A1    Jul. 15, 2010

(30) Foreign Application Priority Data

Jan. 14, 2009    (JP) ................ 2009-005505

(51) Int. Cl.
  *G03B 17/00*    (2006.01)
(52) U.S. Cl. ........................................... 396/80
(58) Field of Classification Search .............. 348/347; 396/80–82
  See application file for complete search history.

(56) References Cited

U.S. PATENT DOCUMENTS

| 4,681,419 | A | * | 7/1987 | Sakai et al. | ............... | 396/82 |
| 5,281,796 | A |   | 1/1994 | Kaneda et al. | | |
| 5,448,413 | A | * | 9/1995 | Kobayashi et al. | ............ | 359/698 |
| 7,751,701 | B2 | * | 7/2010 | Endo | ............... | 396/123 |
| 2005/0078381 | A1 | * | 4/2005 | Okawara | .................. | 359/697 |

FOREIGN PATENT DOCUMENTS

| EP | 0606563 | 8/1998 |
| JP | 2795439 | 9/1998 |
| JP | 2901116 | 6/1999 |

OTHER PUBLICATIONS

The above reference was cited in a Jan. 5, 2012 Chinese Office Action, a copy of which is enclosed with English Translation, that issued in Chinese Patent Application No. 201010001632.1.

* cited by examiner

*Primary Examiner* — Clayton E Laballe
*Assistant Examiner* — Leon W Rhodes, Jr.
(74) *Attorney, Agent, or Firm* — Cowan, Liebowitz & Latman, P.C.

(57) ABSTRACT

The optical apparatus includes a focus signal generator generating a focus signal from a photoelectrical conversion signal of an optical image formed by an optical system including a first lens unit for zooming and a second lens unit for focusing, a memory storing data indicating a relationship between positions of the first and second lens units, the data being generated for each predetermined in-focus distance. The controller moves the second lens unit in infinite and close directions. The controller changes a movement amount of a center position of the movement of the second lens unit in the infinite and close directions according to at least one selected from information on an operation of the optical system, information on a state of the optical system, and information on a photoelectric conversion operation of the optical image.

7 Claims, 14 Drawing Sheets

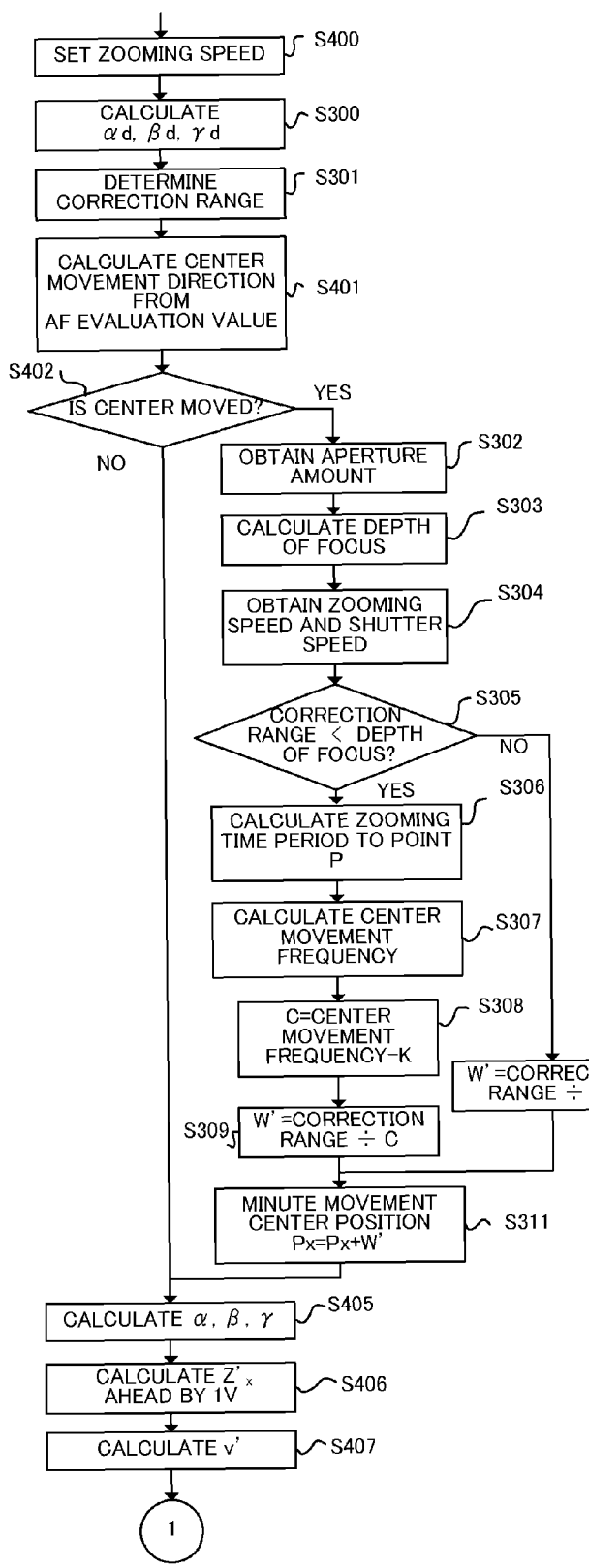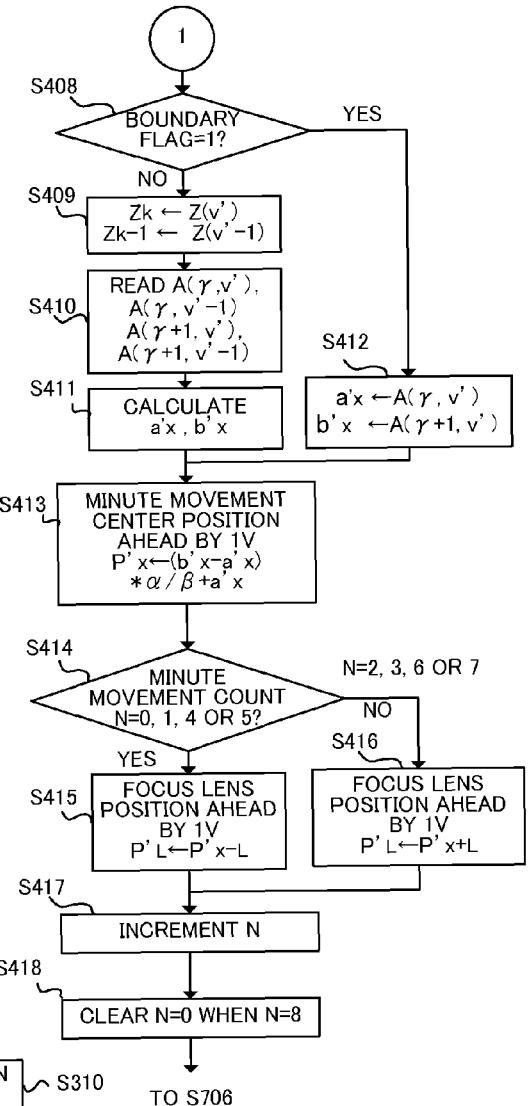
FIG. 3

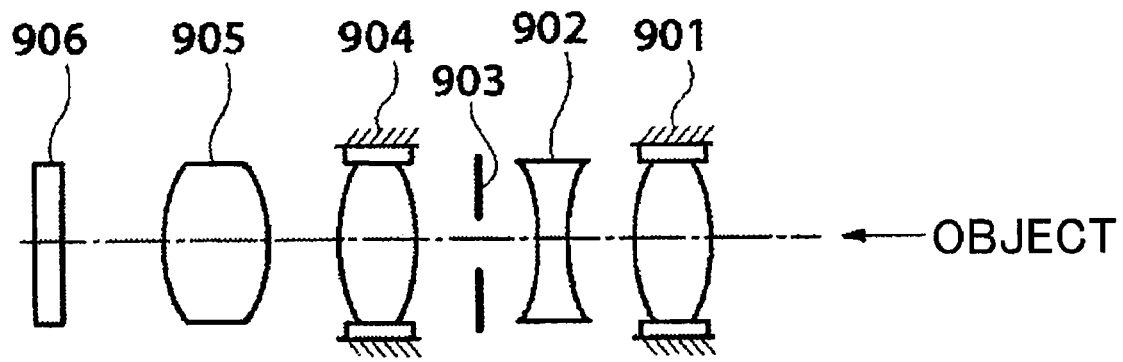
**FIG. 8 *(PRIOR ART)***
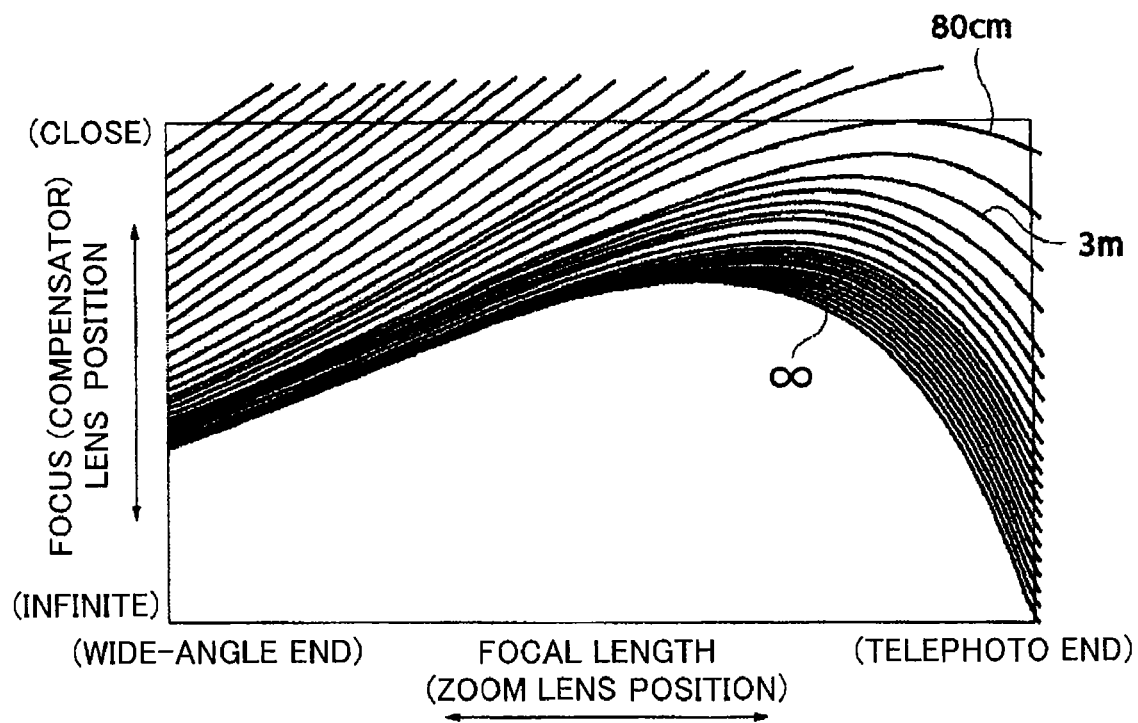
FIG. 9

$$a_x = a_k - \frac{(Z_k - Z_x)(a_k - a_{k-1})}{(Z_k - Z_{k-1})}$$

$$b_x = b_k - \frac{(Z_k - Z_x)(b_k - b_{k-1})}{(Z_k - Z_{k-1})}$$

∞ ← FOCUS LENS POSITION → CLOSE

| | | \multicolumn{7}{c}{n} | | | | | | |
|---|---|---|---|---|---|---|---|---|
| | | 0 | 1 | 2 | 3 | — | k | — | m |
| W ↑ ZOOM LENS POSITION ↓ T | 0 | A00 | A10 | A20 | A30 | — | Ak0 | — | Am0 |
| | 1 | A01 | A11 | A21 | A31 | — | Ak1 | — | Am1 |
| | 2 | A02 | A12 | A22 | A32 | — | Ak2 | — | Am2 |
| V | 3 | A03 | A13 | A23 | A33 | — | Ak3 | — | Am3 |
| | │ | │ | │ | │ | │ | — | │ | — | │ |
| | k | A0k | A1k | A2k | A3k | — | Akk | — | Amk |
| | │ | │ | │ | │ | │ | — | │ | — | │ |
| | s | A0s | A1s | A2s | A3s | — | Aks | — | Ams |

OBJECT DISTANCE $L = \dfrac{B \cdot f}{X}$

LENS CONTROL APPARATUS, OPTICAL APPARATUS AND LENS CONTROL METHOD

BACKGROUND OF THE INVENTION

The present invention relates to lens control processing performed in an optical apparatus such as a video camera.

It is often the case that an optical apparatus including an optical system of an inner focus type has a function of moving, when moving a lens unit for zooming, a lens unit for focusing based on electronic cam tracking data stored in a memory in advance to correct image plane variation accompanying zooming. This function facilitates zooming while an in-focus state is maintained.

FIG. 8 shows a configuration of a conventional lens system of the inner focus type. In the drawing, reference numeral 901 denotes a fixed front lens, reference numeral 902 denotes a magnification-varying lens (zoom lens) for zooming, reference numeral 903 denotes an aperture stop, reference numeral 904 denotes a fixed lens, and reference numeral 905 denotes a focus lens for focusing and having a correcting function (compensating function) of the image plane variation accompanying zooming. Reference numeral 906 denotes an image pickup surface.

In such a lens system of the inner focus type, even though the lens system has a same focal length, different object distances change an in-focus position of the focus lens 905 for focusing on an object that is a focusing target. When the object distance is changed at each focus length, continuously plotting the in-focus positions of the focus lens 905 at which in-focus object images are formed on the image pickup surface 906 provides plural electronic cam tracks for the respective object distances as shown in FIG. 9.

During zooming performed by moving the zoom lens 902, moving the focus lens 905 so as to trace a cam track selected from the plural electronic cam tracks according to the object distance enables zooming while maintaining an in-focus state.

As shown in FIG. 9, when the zoom lens 902 is moved from a telephoto side to a wide-angle side, the plural cam tracks come closer to each other (converge) from a state where spaces therebetween have a certain width. Hence, it is easy to select one cam track according to the object distance. However, when the zoom lens 902 is moved from the wide-angle side to the telephoto side, it is difficult to accurately select one cam track to be traced by the focus lens from the plural cam tracks having narrow spaces therebetween.

Japanese Patent No. 2901116 discloses an optical apparatus using a TV-AF method which determines a cam track to be traced by a focus lens using an AF evaluation value during zooming. This apparatus compares, during zooming, the AF evaluation values (focus signals) obtained by minutely moving the focus lens in a close direction and an infinite direction with each other to determine a direction in which an in-focus position exists (hereinafter referred to as "in-focus direction"). Then, the apparatus moves a center position of the minute movement of the focus lens by a predetermined amount in the determined in-focus direction to repeat the minute movement, thereby determining one cam track to be traced by the focus lens during zooming.

However, as shown in FIG. 9, the spaces between the cam tracks become wider as the zoom lens approaches the telephoto side. Thus, the apparatus disclosed in Japanese Patent No. 2901116 which determines the in-focus direction by using the AF evaluation values while minutely moving the focus lens has a difficulty of determining the cam track to be traced by the focus lens within a limited zooming time period.

Further, a large movement amount of the focus lens to obtain the AF evaluation values for the plural cam tracks may greatly exceed a depth of focus, which causes defocusing.

Moreover, in the TV-AF method, a cycle of obtaining the AF evaluation value corresponds to a cycle of a vertical synchronizing signal, and hence accuracy of determining the cam track decreases as a zooming speed becomes higher. As a result, a frequency of erroneously determining the cam track increases.

Under these circumstances, Japanese Patent No. 2795439 discloses an optical apparatus capable of maintaining an in-focus state even during high-speed zooming and performing zooming without any dependence on a captured scene or camera work. This apparatus detects a distance (object distance) to a focusing target object, and restricts a movable range of a focus lens for correcting a cam track (that is, for obtaining an AF evaluation value) based on the detected distance.

However, Japanese Patent No. 2795439 does not describe how a cam track to be traced should be corrected within the restricted movable range of the focus lens. Hence, a simple restriction on the movable range of the focus lens causes the following problems in a real image pickup environment.

First, the apparatus disclosed in Japanese Patent No. 2795439 restricts the movable range of the focus lens based on a distance detection result and its detection accuracy. Then, the apparatus determines one cam track to be traced from cam tracks within the movable range. However, as shown in FIG. 2, the movable range becomes wider toward the telephoto side. As a result, in a case where the cam track to be traced by the focus lens is determined by repeating the minute movement of the focus lens in the infinite and close directions around one cam track, zooming may be finished without determining the cam track.

As described above, in the TV-AF method, the cycle of obtaining the AF evaluation values corresponds to the cycle of the vertical synchronizing signal, and hence the number of times of obtaining the AF evaluation values is reduced as the zooming speed increases. As a result, the number of times of moving the center position of the minute movement is reduced. In other words, since the cam track to be traced by the focus lens is determined within the movable range with a small number of times of moving the center position of the movement, erroneous determination of the cam track may often be made, which reduces determination accuracy of the cam track.

Similarly, during a long time exposure such as a so-called slow shutter, even if the zooming speed is not high, the cycle of obtaining the AF evaluation value corresponds to an exposure cycle. As a result, the determination accuracy of the cam track is reduced.

Thus, the optical apparatus disclosed in Japanese Patent No. 2795439 does not determine the cam track to be traced by the focus lens from plural cam tracks for all object distances from an infinite end to a closest end, but narrows down the cam track to be traced within the restricted movable range based on the detection distances. However, when high-speed zooming is performed, a number of and an amount of the center position movement need to be set by taking the number of times of obtaining the AF evaluation value into consideration. Nonetheless, Japanese Patent No. 2795439 discloses no setting method that takes the number of times of obtaining the AF evaluation value into consideration

SUMMARY OF THE INVENTION

The present invention is directed to a lens control apparatus, an optical apparatus and a lens control method enabling high quality zooming while maintaining an in-focus state even during high-speed zooming.

The present invention provides as one aspect thereof a lens control apparatus configured to move a first lens unit for zooming and a second lens unit for focusing. The apparatus includes a focus signal generator configured to generate a focus signal indicating a focus state of an optical system from a photoelectrical conversion signal of an optical image formed by the optical system including the first and second lens units, a memory configured to store data generated for each predetermined in-focus distance and indicating a relationship between a position of the first lens unit and a position of the second lens unit, a controller configured to control, based on the data, movement of the second lens unit accompanying movement of the first lens unit, and a detector configured to detect information corresponding to a distance to a focusing target object. The controller moves the second lens unit in an infinite direction and a close direction within a movable range set based on the information corresponding to the distance. The controller changes a movement amount of a center position of the movement of the second lens unit in the infinite and close directions according to at least one selected from (a) information on an operation of the optical system, (b) information on a state of the optical system, and (c) information on a photoelectric conversion operation of the optical image.

The present invention provides as another aspect thereof an optical apparatus including an optical system configured to include a first lens unit for zooming and a second lens unit for focusing, and the above lens control apparatus.

The present invention provides as still another aspect thereof a lens control method for moving a first lens unit for zooming and a second lens unit for focusing. The method includes a focus signal generation step of generating a focus signal indicating a focus state of an optical system from a photoelectrical conversion signal of an optical image formed by the optical system including the first and second lens units, a control step of controlling movement of the second lens unit accompanying movement of the first lens unit based on data generated for each predetermined in-focus distance and indicating a relationship between a position of the first lens unit and a position of the second lens unit, and a detection step of detecting information corresponding to a distance to a focusing target object. The control step moves the second lens unit in an infinite direction and a close direction within a movable range set based on the information corresponding to the distance. The control step changes a movement amount of a center position of the movement of the second lens unit in the infinite and close directions according to at least one selected from (a) information on an operation of the optical system, (b) information on a state of the optical system, and (c) information on a photoelectric conversion operation of the optical image.

Other aspects of the present invention will become apparent from the following description and the attached drawings.

BRIEF DESCRIPTION OF THE DRAWINGS

FIG. 3 is a flowchart showing an operation in the video camera according to the embodiment.

FIG. 8 is a schematic diagram showing a configuration of a conventional image taking optical system.

FIG. 9 is a conceptual diagram showing in-focus cam tracks corresponding to object distances.

DESCRIPTION OF THE EMBODIMENTS

Exemplary embodiments of the present invention will hereinafter be described with reference to the accompanying drawings.

(Presupposed Technology)

First, a basic technology for an embodiment of the present invention will be described before description of the embodiment.

Figure 10:
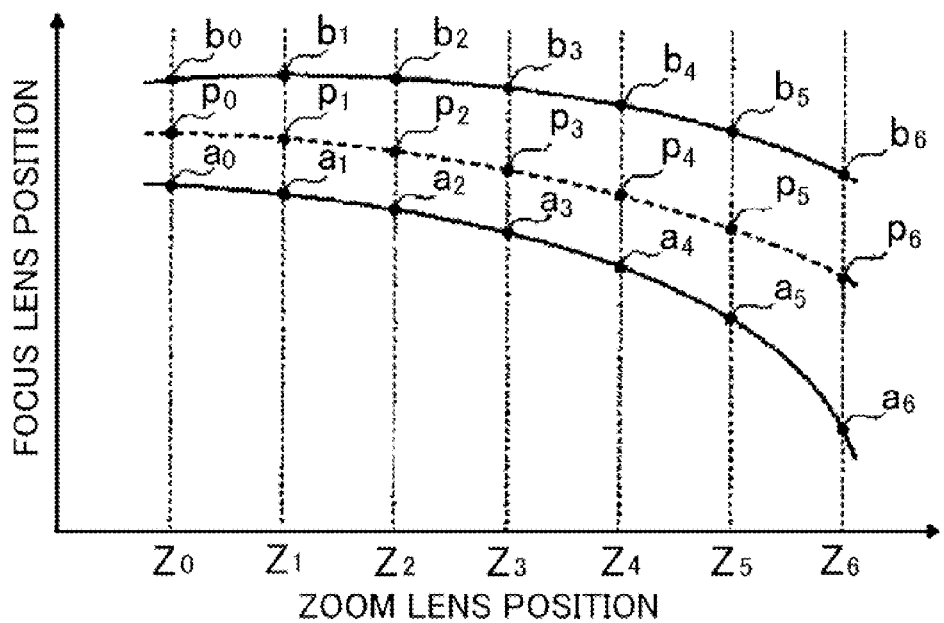
FIG. 10 shows in-focus cam tracks.

FIG. 10 shows an example of a cam track tracking method of a focus lens in a lens system of an inner focus type.

In FIG. 10, reference characters $Z_0, Z_1, Z_2, \ldots, Z_6$ denote positions of a zoom lens. Reference characters $a_0, a_1, a_2, \ldots, a_6$ and $b_0, b_1, b_2, \ldots, b_6$ denote positions of the focus lens stored in advance in a microcomputer (not shown) corresponding to object distances. Sets of these focus lens positions $(a_0, a_1, a_2, \ldots, a_6$ and $b_0, b_1, b_2, \ldots, b_6)$ form in-focus cam tracks (hereinafter referred to as "representative cam tracks") to be traced by the focus lens for representative object distances.

Additionally, reference characters $p_2, \ldots, p_6$ denote positions on an in-focus cam track to be traced by the focus lens calculated based on the two representative cam tracks. The positions on the in-focus cam track are calculated by the following expression (1):

$$p_{(n+1)} = |p_{(n)} - a_{(n)}| / |b_{(n)} - a_{(n)}| \times |b_{(n+1)} - a_{(n+1)}| + a_{(n+1)} \tag{1}$$

According to this expression (1), for example, when the focus lens is located at the position $p_0$ in FIG. 10, an internal division ratio of internally dividing a line segment $b_0 - a_0$ by $p_0$ is obtained, and a point of internally dividing a line segment $b_1 - a_1$ according to this internal division ratio is defined as $p_1$. A moving speed of the focus lens to maintain an in-focus state can be known from a positional difference between $p_1$ and $p_0$ and a time period necessary for moving the zoom lens from $Z_0$ to $Z_1$.

Figure 11:
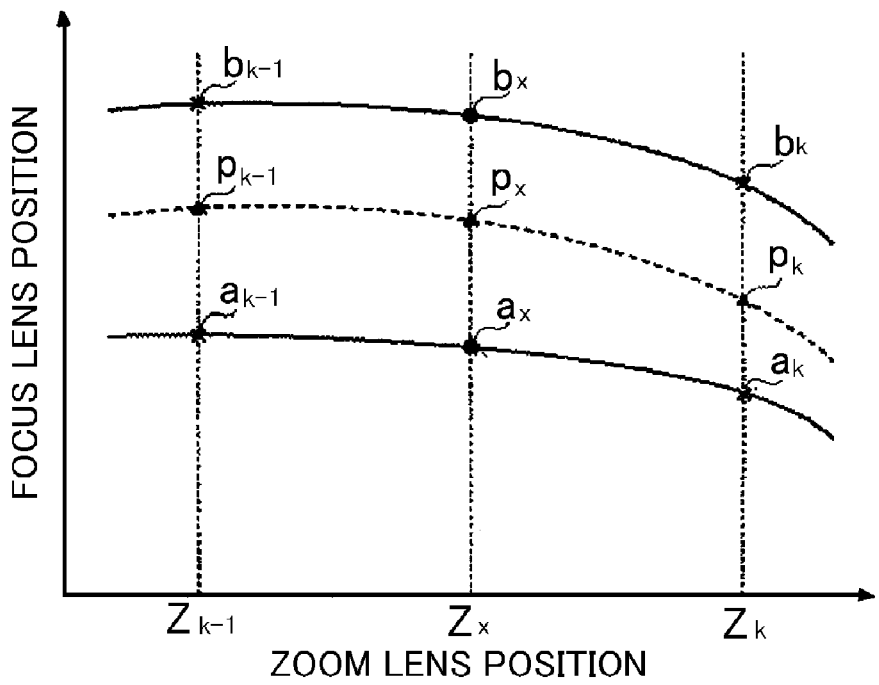
FIG. 11 shows a method of interpolation in a zoom lens moving direction.

Next, description will be made of a case where there is not a restriction in which a stop position of the zoom lens should be set only on a boundary of zoom areas having stored representative cam track data. FIG. 11 shows a method of interpolation in a moving direction of the zoom lens, where a part of FIG. 10 is extracted and a position of the zoom lens is optional.

In FIG. 11, a vertical axis indicates positions of the focus lens (hereinafter referred to as "focus lens positions"), and a horizontal axis indicates positions of the zoom lens (hereinafter referred to as "zoom lens positions"). When the zoom lens positions are denoted by $Z_0, Z_1, \ldots, Z_{k-1}, Z_k, \ldots, Z_n$, the focus lens positions are denoted as follows for respective object distances:

$a_0, a_1, \ldots, a_{k-1}, a_k, \ldots, a_n$
$b_0, b_1, \ldots, b_{k-1}, b_k, \ldots, b_n$ When a zoom lens position is $Z_x$ which is not located on the boundary of the zoom areas (hereinafter referred to as "zoom area boundary") and a focus lens position is $p_x$, $a_x$ and $b_x$ are calculated by the following expressions (2) and (3):

$$a_x = a_k - (Z_k - Z_x) \times (a_k - a_{k-1})/(Z_k - Z_{k-1}) \quad (2)$$

$$b_x = b_k - (Z_k - Z_x) \times (b_k - b_{k-1})/(Z_k - Z_{k-1}) \quad (3)$$

In other words, an internal division ratio is obtained from a current zoom lens position and two zoom area boundary positions (e.g., $Z_k$ and $Z_{k-1}$ in FIG. 11). Then, two cam track data for a same object distance in the stored four representative cam track data ($a_k$, $a_{k-1}$, $b_k$ and $b_{k-1}$ in FIG. 11) are internally divided based on the above internal division ratio to obtain $a_x$ and $b_x$.

Further, according to an internal division ratio obtained from $a_x$, $p_x$ and $b_x$, two cam track data for a same focal length in the stored four representative cam track data are internally divided as in the case of the expression (1). This way, $p_k$ and $p_{k-1}$ can be obtained.

During zooming from a wide-angle side to a telephoto side, a moving speed of the focus lens necessary for maintaining an in-focus state can be known from a difference between a focus position $p_k$ which is a tracking movement destination and a current focus position $p_x$ and a time period necessary for moving the zoom lens from $Z_x$ to $Z_k$.

During zooming from the telephoto side to the wide-angle side, a moving speed of the focus lens for maintaining an in-focus state can be known from a difference between a focus position $p_{k-1}$ which is a tracking movement destination and the current focus position $p_x$ and a time period necessary for moving the zoom lens from $Z_x$ to $Z_{k-1}$.

Figures 12, 13:
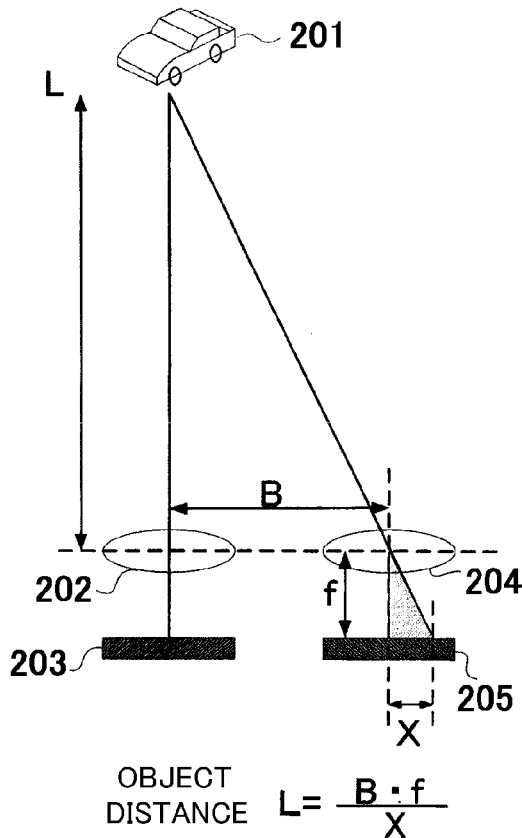
FIG. 12 shows an example of a data table of in-focus cam tracks.
FIG. 13 shows a triangulation method.

FIG. 12 shows an example of table data of in-focus cam track information stored in advance in the microcomputer. FIG. 12 shows focus lens position data $A_{(n, v)}$ for respective object distances, the focus lens position data being changed depending on zoom lens positions. The object distance changes in a column direction of a variable n, and the zoom lens position (focal length) changes in a row direction of a variable v. In this case, n=0 indicates an infinite object distance, the object distance changes to a closest distance side as n increases, and n=m indicates an object distance of 1 cm.

In FIG. 12, v=0 indicates a wide-angle end. As v becomes larger, the focal length increases, and v=s indicates a zoom lens position of a telephoto end. Thus, table data of one column corresponds to one representative cam track.

Next, description will be made of a cam track tracing method for solving the aforementioned problem in which the cam track to be traced by the focus lens during zooming from the wide-angle side to the telephoto side cannot be determined.

Figure 15:
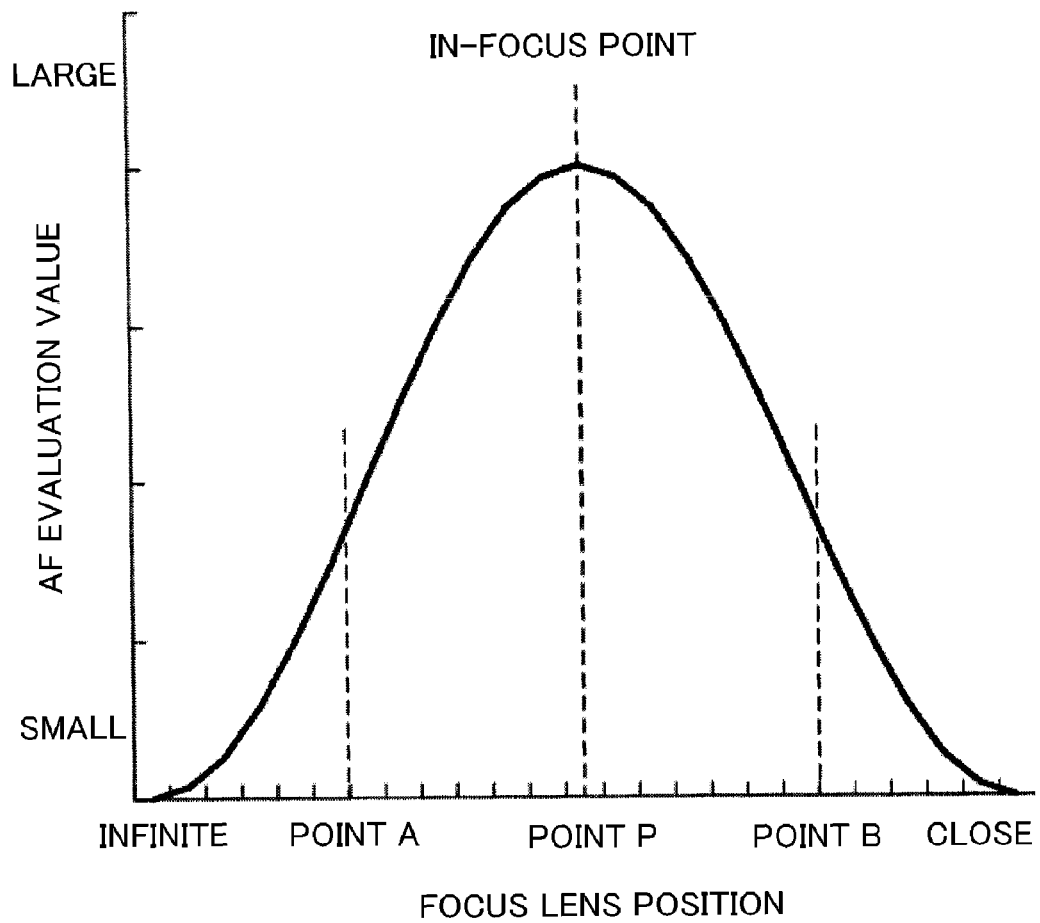
FIG. 15 shows a relationship between AF evaluation values and in-focus positions.

FIG. 15 shows change of an AF evaluation signal when the focus lens is moved from a close side to an infinite side. The AF evaluation signal indicates a level of a high frequency component (sharpness signal) of an image pickup signal. A point P where the value of the AF evaluation signal (hereinafter referred to "AF evaluation value") becomes a peak corresponds to an in-focus position of the focus lens.

Thus, continuously maintaining the focus lens at the peak (point P) of the AF evaluation value can solve the problem in which a cam track to be traced during zooming cannot be determined. However, the peak of the AF evaluation value is a relative value, which is sequentially changed due to change of an angle of view or a contrast change of an object by the zooming. Thus, minutely moving the focus lens in the infinite direction and the close direction to observe changes in AF evaluation value enables detection of a direction in which the peak (in-focus position) of the AF evaluation value is present.

In FIG. 15, when the focus lens is minutely moved with a point A or a point B set as a center position, the AF evaluation value repeatedly increases and decreases, exhibiting great fluctuation. A peak of the AF evaluation value is present in a direction in which the AF evaluation value increases during the minute movement, and hence moving the focus lens in that increase direction enables specifying of the peak of the AF evaluation value.

Figure 16:
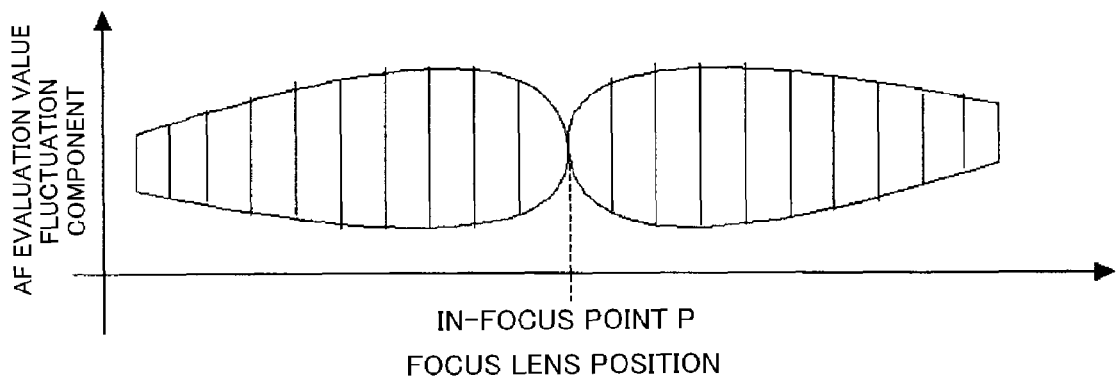
FIG. 16 shows fluctuation components of the AF evaluation values.

At the point P, when the focus lens is minutely moved, the AF evaluation value fluctuates in a small width. This fluctuation is as shown in FIG. 16. In the vicinity of an in-focus point, even when the focus lens is moved in the infinite and close directions, AF evaluation values tend to decrease in both those directions, and hence the in-focus point is specified by using this characteristic. When the AF evaluation values are repeatedly obtained by continuous reciprocation of the focus lens in a same area plural number of times, a determination is made that the focus lens is located at an in-focus point.

Figure 17A:
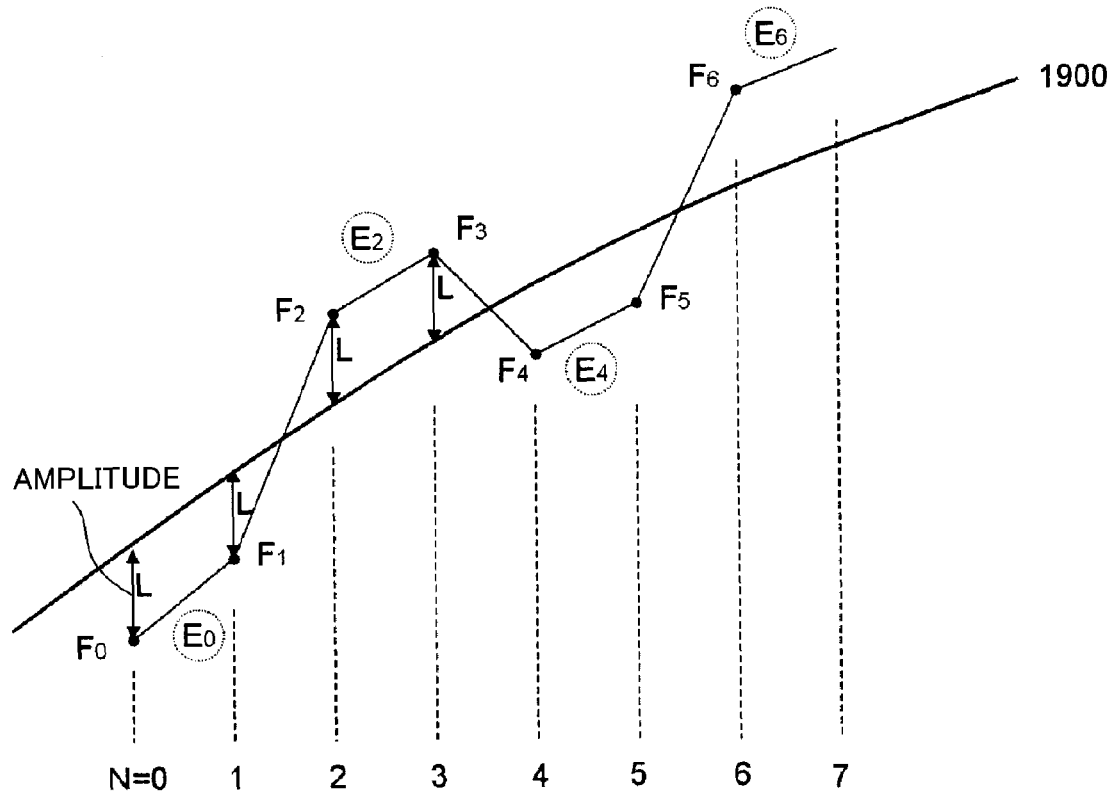
FIGS. 17A and 17B show minute movement of a focus lens and changes in AF evaluation value in the embodiment.

In FIG. 17A, a cam track (set of focus lens positions) to be traced by the focus lens during zooming performed while maintaining an in-focus state for an object located at a certain distance is denoted by reference numeral 1900. Minute movement of the focus lens will be described in which the cam track 1900 is a center cam track corresponding to a center position of the minute movement of the focus lens.

When the focus lens is located at a point $F_0$ away by L from the center cam track to the infinite side, in order to obtain an AF evaluation value at the point $F_0$, the focus lens is moved to a point $F_1$ (point away by L from the center cam track to the infinite side) with the same inclination as that of the center cam track 1900. Thus, an AF evaluation value $E_0$ is obtained.

Then, the focus lens is moved to a point $F_2$ away by L from the center cam track 1900 to the close side.

Then, in order to obtain an AF evaluation value at the point $F_2$, the focus lens is moved to a point $F_3$ (point away by L from the center cam track 1900 to the close side) with the same inclination as that of the center cam track 1900, and thereby an AF evaluation value $E_2$ is obtained. Similarly, the focus lens is moved to a point $F_4$ away by L from the center cam track 1900 to the infinite side. Repeating these operations enables minute movement of the focus lens around the center cam track 1900.

Figure 17B:
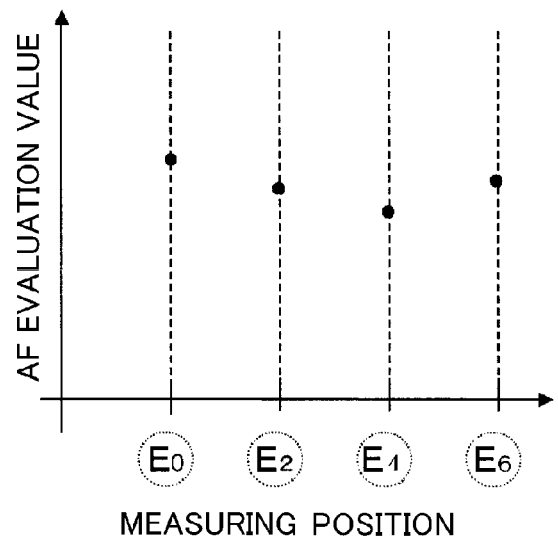

In the above movement of the focus lens, since the cam track to be traced (in-focus cam track) is the center cam track 1900, the AF evaluation values $E_0, E_2, E_4, \ldots$ of the close side and the infinite side obtained by the minute movement are approximately constant as shown in FIG. 17B. In other words, the lens system is in a situation where zooming is performed while maintaining an in-focus state.

Figure 18A:
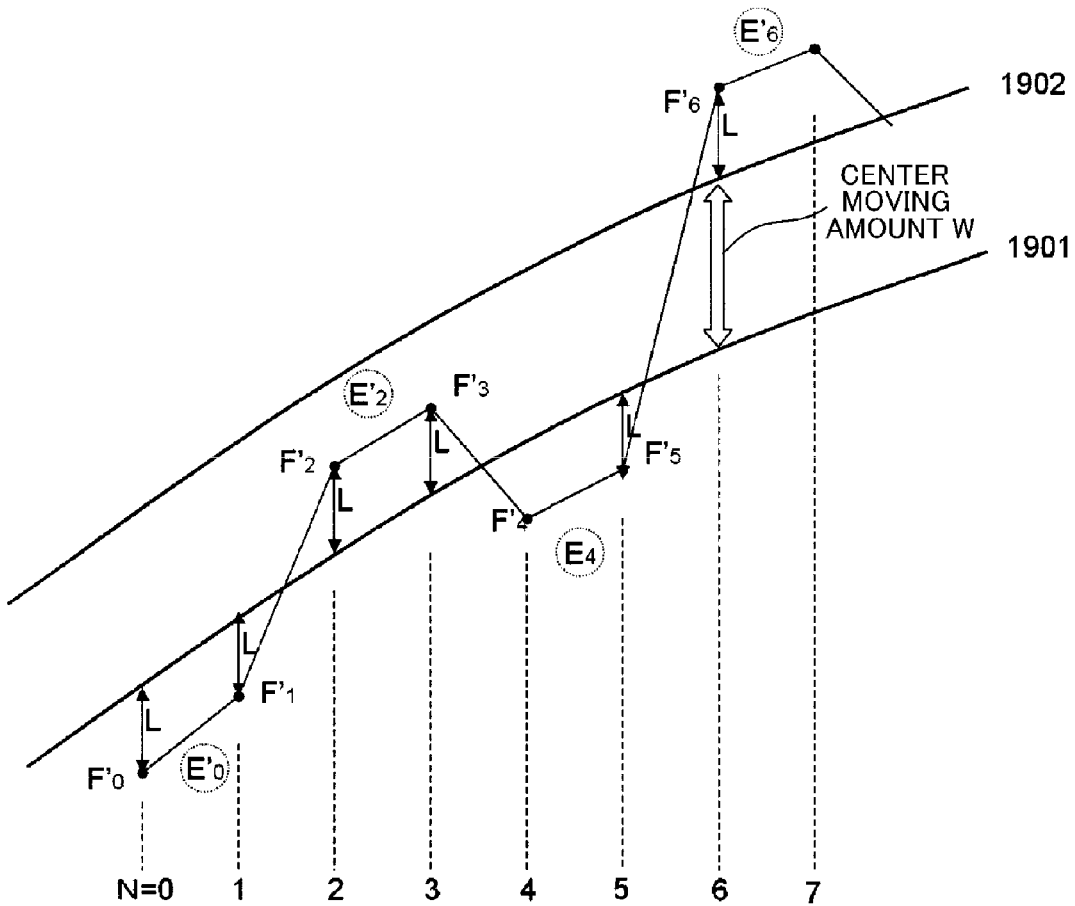
FIGS. 18A and 18B show movement of a center position of the minute movement of the focus lens and changes in AF evaluation value in the embodiment.

However, the center cam track is not always a cam track (in-focus cam track) to be traced by the focus lens. Referring to FIG. 18A, this case will be described. First, when the focus lens is located at a point $F'_0$, the minute movement is performed with a virtual center cam track 1901 set as a center.

When the focus lens is moved from the point $F'_0$ to a point $F'_5$, AF evaluation values $E'_0$, $E'_2$, and $E'_4$ on the track are stored. These AF evaluation values are compared with one another to determine a next focus position $F'_5$.

Figure 18B:
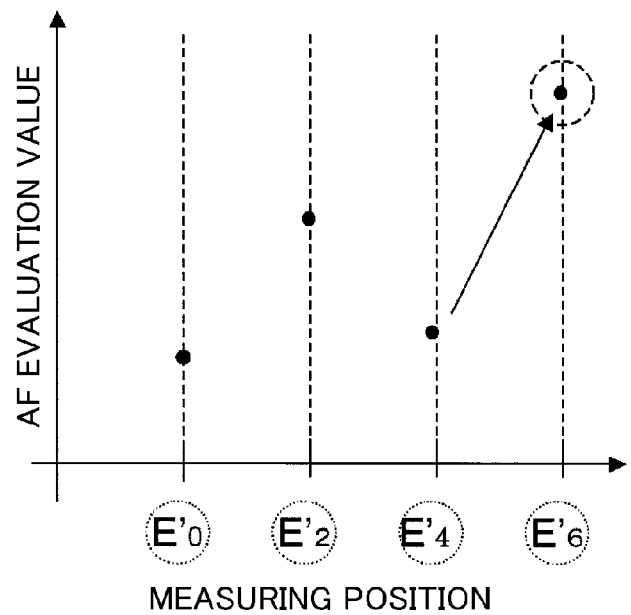

When the AF evaluation values are as shown in FIG. 18B, from relationships of $E'_0 < E'_2$ and $E'_4 < E'_2$, it can be known that a peak of the AF evaluation value is present in a direction of $E'_2$, in other words, there is a cam track to be traced (in-focus cam track) on the close side.

Thus, the position $F'_5$ is moved closer by an amount W to the close side than the virtual center cam track 1901. Then, the minute movement is performed again with a cam track (virtual center cam track) 1902 located closer by the amount W to the close side than the cam track 1901.

Similarly, with the virtual center cam track 1902 set as a center, the minute movement is performed several number of times to compare obtained AF evaluation values with one another. The amount (center movement amount) W is set based on the comparison result, and change of the center cam track is repeatedly performed until an in-focus cam track is determined.

As described above, this embodiment determines (specifies), based on the AF evaluation values obtained in the minute movement of the focus lens during zooming, a cam track according to which the AF evaluation values are approximately constant while changing the center cam track. As a result, the problem in which the cam track to be traced by the focus lens during zooming from the wide-angle side to the telephoto side cannot be determined can be solved.

The aforementioned zooming control is generally performed, for a reason that focus detection is performed by using an image pickup signal from the image pickup element, in synchronization with a vertical synchronizing signal of an image (video).

Figure 7:
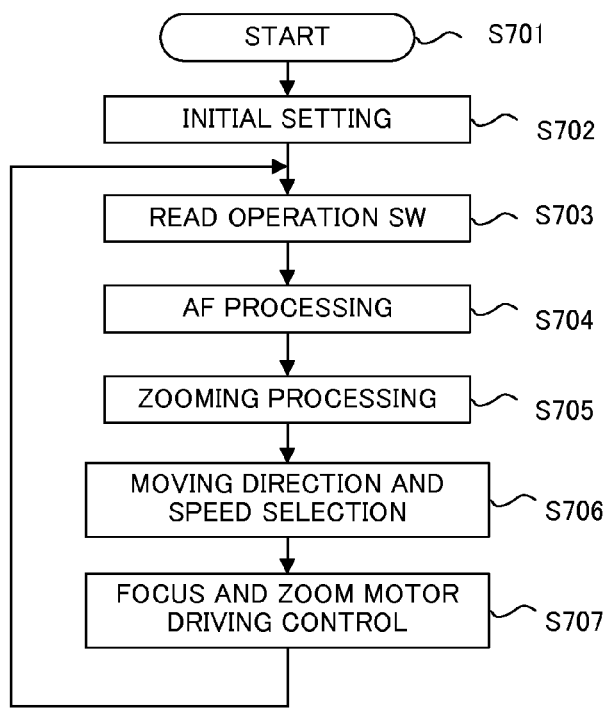

FIG. 7 is a flowchart showing the zooming control performed in the microcomputer. When processing of the zooming control is started at Step S701, the microcomputer performs at Step S702 initial settings. In the initial settings, a RAM and various ports in the microcomputer are initialized.

At Step S703, the microcomputer detects a state of an operation system of a camera body. The microcomputer receives information on a zoom switch unit operated by a user, and displays magnification variation (zooming) operation information such as a zoom lens position on the display in order to notify the user of zooming execution.

At Step S704, the microcomputer performs AF processing. In other words, the microcomputer performs autofocus processing according to changes of the AF evaluation signal.

At Step S705, the microcomputer performs zooming processing. In other words, the microcomputer performs processing of a compensating operation for maintaining an in-focus state during zooming. Specifically, in order to trace the cam track shown in FIG. 9, the microcomputer calculates a standard moving direction and a standard moving speed of the focus lens.

At Step S706, the microcomputer selects any of the moving directions and the moving speeds for the zoom lens and the focus lens calculated from the processing at Steps S704 and S705 to use during the AF processing and the zooming. This process is for moving the zoom lens and the focus lens between a controlled telephoto end and a controlled wide-angle end and a controlled closest end and a controlled infinite end, each controlled end being provided by software such that the lens comes into contact with mechanical ends.

At Step S707, the microcomputer outputs a control signal to a motor driver according to information of the moving direction and information of the moving speed for zooming and focusing set at Step S706 to control drive and stop of each lens. After completion of the processing at Step S707, the microcomputer returns to step S703.

The series of processing shown in FIG. 7 is executed in synchronization with the vertical synchronizing signal (that is, the microcomputer stands by until input of a next vertical synchronizing signal during processing at Step S703).

Figure 5:
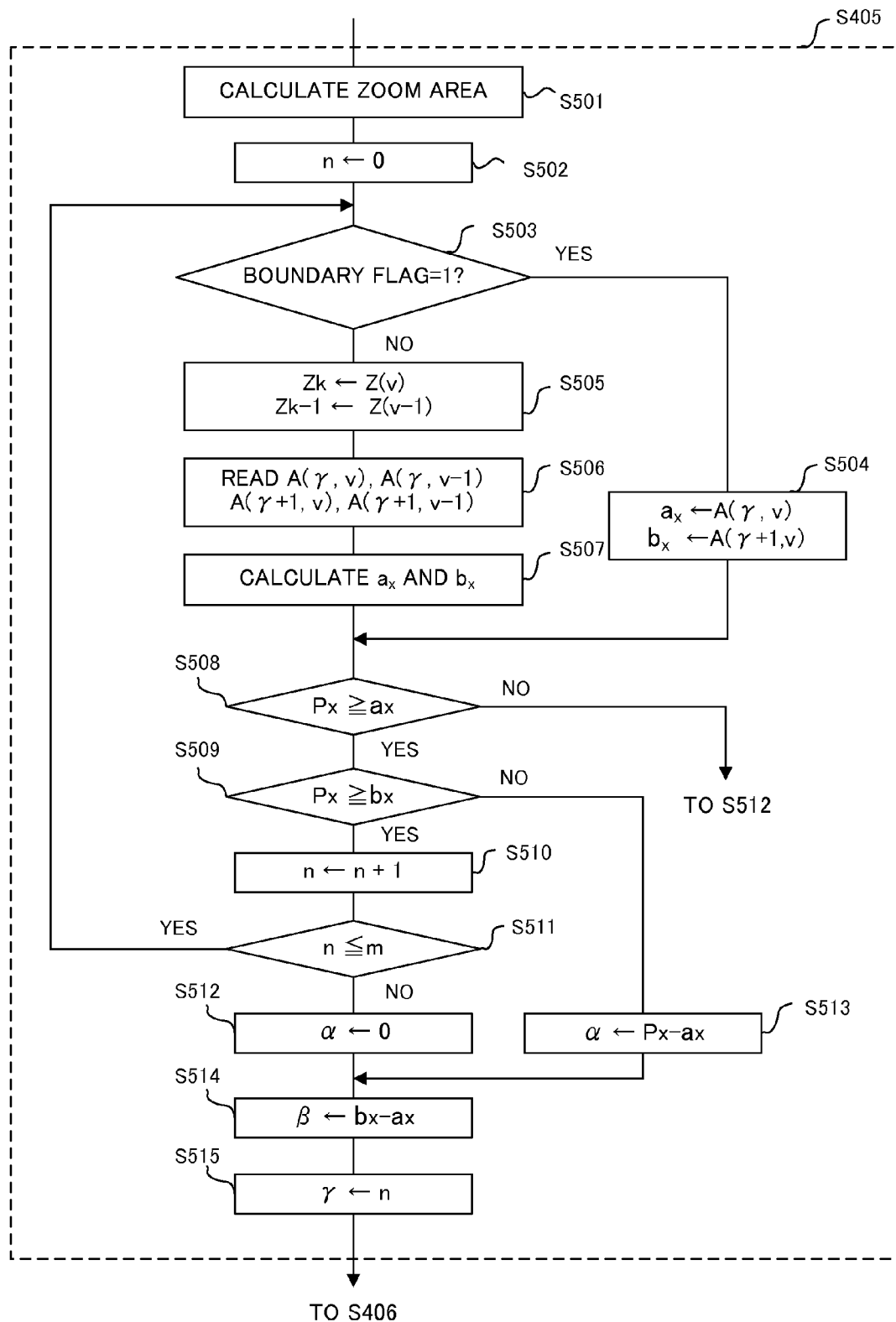
Figure 6:
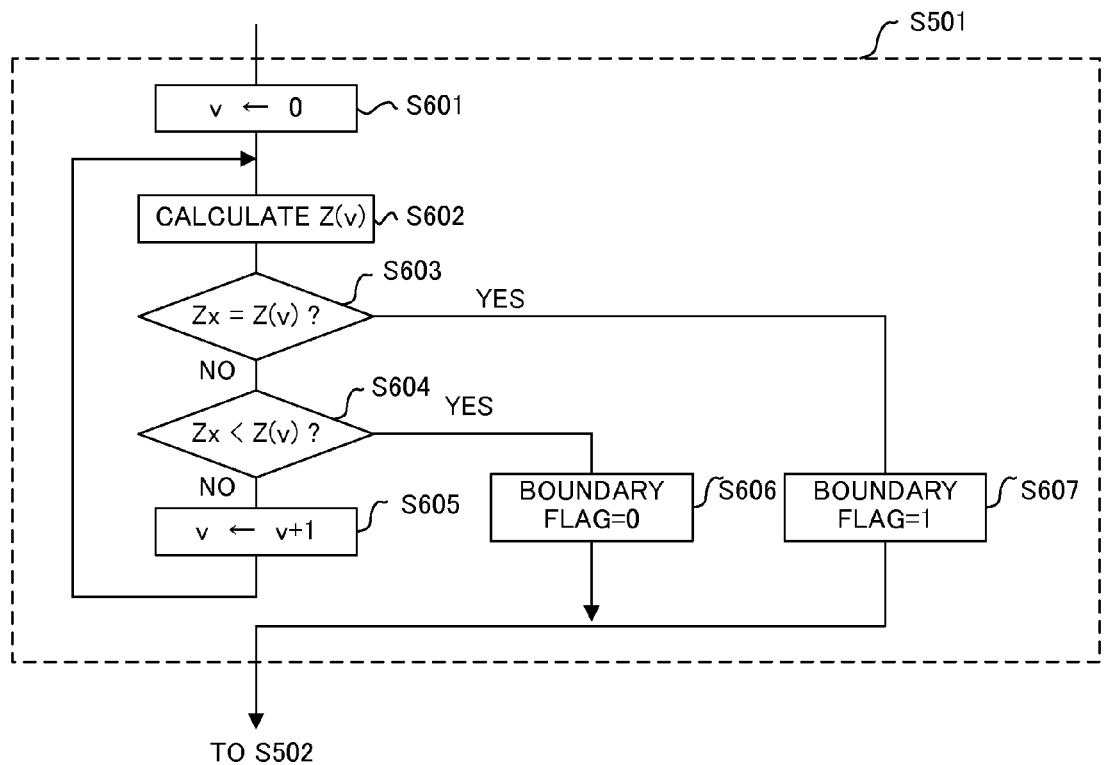

FIGS. 5 and 6 show a control flow performed once by the microcomputer during one vertical synchronization time period, showing in detail the processing performed at Step S705 shown in FIG. 7.

Hereinafter, referring to FIGS. 4 to 7 and 10, the processing will be described.

Figure 4:
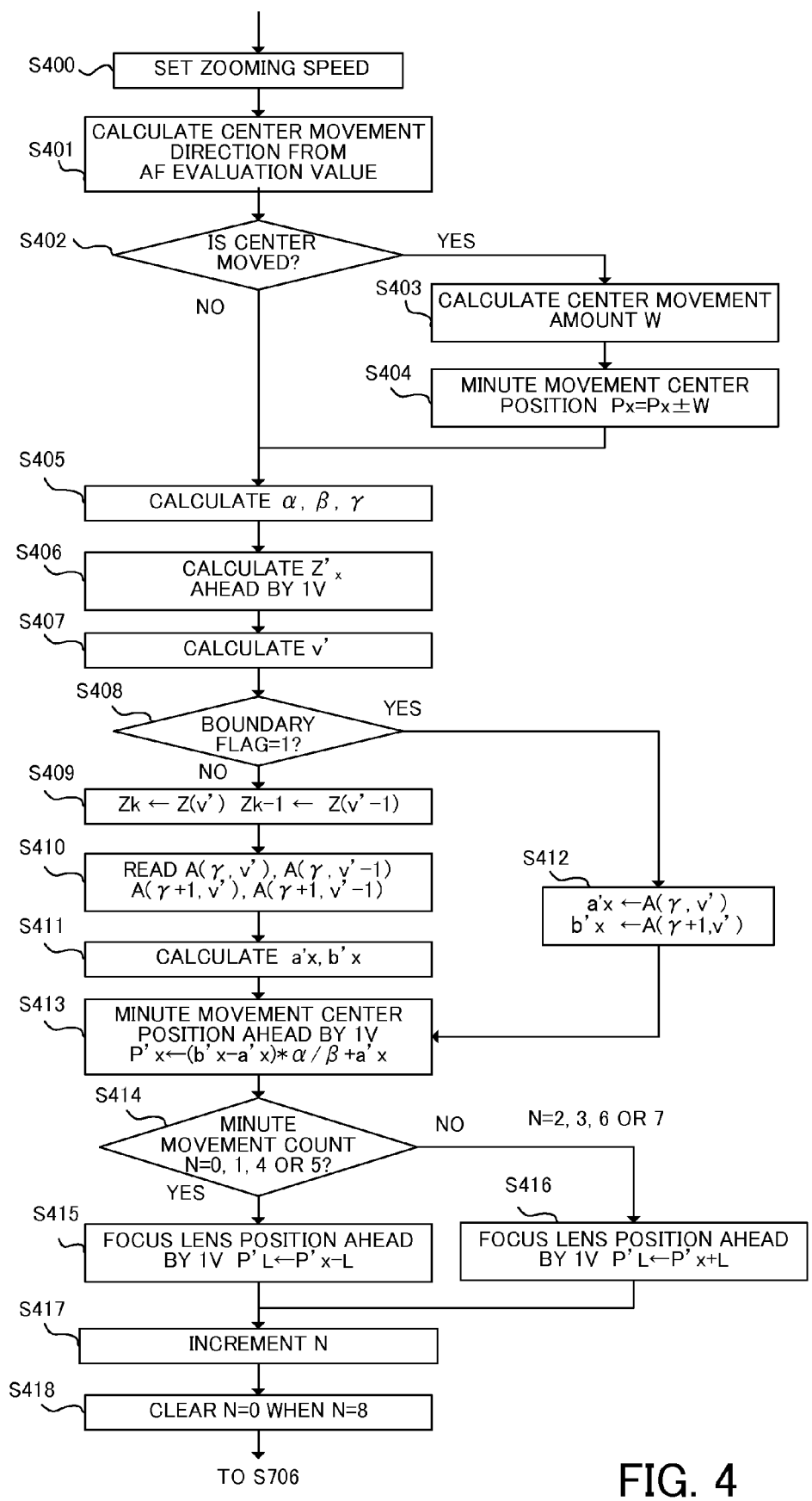
FIGS. 4 to 7 are flowcharts showing a presupposed technology of the present invention.

At Step S400 shown in FIG. 4, the microcomputer sets a driving speed (zooming speed Zsp) of a zoom motor to enable a natural zooming operation according to operation information of the zoom switch unit.

At Step S401, the microcomputer compares the AF evaluation values of the close side and the infinite side with respect to the center cam track obtained by the minute movement with one another to determine a direction of a center movement. In this determination method, as shown in FIG. 17B, at least three continuous AF evaluation values such as infinite side AF evaluation values $E_0$ and $E_4$ and close side AF evaluation values $E_2$ and $E_6$ are compared with one another to set a direction of a higher AF evaluation value as a center movement direction.

When the focus lens is continuously reciprocated a predetermined number of times in a same area with respect to the center cam track to repeatedly obtain AF evaluation values, the microcomputer determines that this area including an in-focus point (in-focus cam track). When performing the center movement, the microcomputer sets signs + and − respectively indicating the close side and the infinite side.

Subsequently, at Step S402, the microcomputer determines a necessity of the center movement. If the center movement is necessary (that is, if the lens system is in an out-of-focus state where no AF evaluation value indicating an in-focus state is obtained), the microcomputer calculates at step S403 the center movement amount W. If no center movement is necessary, in other words, if the lens system is in an in-focus state, the microcomputer returns to step S405.

The center movement amount W is calculated at Step S403 based on a focal length (zoom lens position) and the like. As shown in FIG. 9, a space between the cam tracks varies depending on the focal length. The cam tracks are collected so as to be converged on the wide-angle side, while the spaces therebetween are gradually increased toward the telephoto side. For example, when the center movement amount W is set to be constant irrespective of the focal length, the cam tracks are densely set on the wide-angle side, and hence one center movement enables changing between cam tracks for different object distances.

On the other hand, since the spaces between the cam tracks are wider on the telephoto side than those on the wide-angle side, if the center movement amount W is equal to that on the wide-angle side, changing between cam tracks for different object distances is difficult. Thus, the center movement amount W is changed depending on the focal length, and its value is determined based on the space between the cam tracks. The center movement amount W is set to a value enough for the focus lens to minutely move (cover) on all the cam tracks from a cam track for an infinite object distance to a cam track for a closest object distance.

A sign is added to the determined center movement amount W based on the moving direction of the focus lens. At Step S404, the microcomputer adds the center movement amount W to a minute movement center focus lens position $P_x$ to update $P_x$ as follows:

$$P_x = P_x \pm W$$

When the center movement occurs, the focus lens is minutely moved by using this updated $P_x$ as a new minute movement center focus lens position.

Next, at Step S405, the microcomputer performs processing shown in FIG. 5 by using three cam track parameters α, β and γ to detect one of the cam tracks shown in FIG. 9 on which the zoom lens and the minute movement center focus lens position are currently located. Hereinafter, the processing of FIG. 5 will be described by assuming that an in-focus state is maintained on current lens positions.

At Step S501 shown in FIG. 5, the microcomputer calculates a zoom area v where a current zoom position $Z_x$ is located in a data table shown in FIG. 12. The zoom area v is one of zoom areas formed by equally dividing an entire zoom range from the wide-angle end to the telephoto end into s areas. Referring to FIG. 6, this calculation method will be described.

At Step S601, the microcomputer clears a zoom area variable v. At Step S602, the microcomputer calculates a zoom lens position $Z_{(v)}$ on a boundary of the zoom area v with the following expression (6). This zoom lens position $Z_{(v)}$ corresponds to the zoom lens positions $Z_0, Z_1, Z_2, \ldots$ shown in FIG. 10.

$$Z_{(v)} = (\text{telephoto end zoom lens position} - \text{wide-angle end zoom lens position}) \times v/s + \text{wide-angle end zoom lens position} \quad (6)$$

At Step S603, the microcomputer determines whether or not the zoom lens position $Z_{(v)}$ obtained at Step S602 is coincident with the current zoom lens position $Z_x$. If the zoom lens position $Z_{(v)}$ is coincident with the current zoom lens position $Z_x$, the microcomputer at step S607 sets a boundary flag to 1 which indicates that the zoom lens position $Z_x$ is located on the boundary of the zoom area v.

If the zoom lens position $Z_{(v)}$ is not coincident with the current zoom lens position $Z_x$ at Step S603, the microcomputer at Step S604 determines whether or not a relationship of $Z_x < Z_{(v)}$ is established. If the relationship is established at Step S604, the current zoom lens position $Z_x$ is located between $Z_{(v-1)}$ and $Z_{(v)}$, and the microcomputer at Step S606 sets the boundary flag to 0. If the relationship is not established at Step S604, the microcomputer at step S605 increments the zoom area v and then returns to step S602.

Repeating the above processing enables, when the processing goes out of the flowchart of FIG. 6, detection of whether the current zoom position $Z_x$ is located in the v-th (=k-th) zoom area in the data table of FIG. 12 and further located on the zoom area boundary.

Returning to FIG. 5, at Step S501, the current zoom area has been determined by the processing of FIG. 6. Hence, in the following processing, the microcomputer calculates a position of the focus lens in the data table of FIG. 12.

First, at Step S502, the microcomputer clears an object distance variable n. At Step S503, the microcomputer determines whether or not the current zoom lens position is located on the zoom area boundary. If the boundary flag is 0, the microcomputer proceeds to Step S505 and subsequent steps since the current zoom lens position is not located on the zoom area boundary.

At Step S505, the microcomputer sets $Z_{(v)}$ to $Z_k$, and sets $Z_{(v-1)}$ to $Z_{k-1}$. Then, at Step S506, the microcomputer reads four table data $A_{(n, v-1)}, A_{(n, v)}, A_{(n+1, v-1)}$ and $A_{(n+1, v)}$. At Step S507, the microcomputer calculates $a_x$ and $b_x$ with the expressions (2) and (3).

On the other hand, if the boundary flag is 1 at Step S503, the microcomputer at Step S504 loads an in-focus position $A_{(n, v)}$ corresponding to a zoom lens position (v in this description) at the object distance n and $A_{(n+1, v)}$ corresponding to a zoom lens position at the object distance n+1. The microcomputer respectively stores them as $a_x$ and $b_x$ in the memory.

At Step S508, the microcomputer determines whether or not the minute movement center focus lens position $P_x$ is equal to or higher than $a_x$. If $P_x$ is equal to or higher than $a_x$, the microcomputer at step S509 determines whether or not the minute movement center focus lens position $P_x$ is equal to or higher than $b_x$. If $P_x$ is not equal to or higher than $b_x$, the minute movement center focus lens position $P_x$ is located between the object distances n and n+1, and the microcomputer stores cam track parameters for this case in the memory at Steps S513 to S515. At step S513, the microcomputer sets $\alpha = P_x - a_x$. At Step S514, the microcomputer sets $\beta = b_x - a_x$. At Step S515, the microcomputer sets γ=n.

The microcomputer determines "No" at Step S508 when the minute movement center focus lens position $P_x$ is a super-infinite position. In this case, the microcomputer at Step S512 sets α=0, and then proceeds to Step S514 and subsequent steps thereof to store cam track parameters for the infinite object distance in the memory.

The microcomputer determines "Yes" at Step S509 when the minute movement center focus lens position $P_x$ is located further to the close side. In this case, the microcomputer increments the object distance n at Step S510, and determines whether or not the object distance n is further to the infinite side than a position m corresponding to the closest position at Step S511. If the position n is further to the infinite side than the closest distance position m, the microcomputer returns to Step S503.

The microcomputer determines "No" at Step S511 when the minute movement center focus lens position $P_x$ is located at a superclose position. In this case, the microcomputer proceeds to Step S512 and subsequent steps thereof to store cam track parameters for the closest object distance in the memory.

Referring back to FIG. 4, as described above, at Step S405, the microcomputer stores the cam track parameters for detecting whether the current zoom lens position and the minute movement center focus lens position are located on the cam tracks shown in FIG. 9.

Then, at Step S406, the microcomputer calculates a zoom lens position (movement destination position from the current zoom lens position) $Z'_x$ where the zoom lens will reach after one vertical synchronizing time period (1V). The zoom lens position $Z'_x$ after one vertical synchronizing time period can be calculated by the following expression (7), where Zsp(pps) denotes a zooming speed determined at Step S400.

$$Z'_x = Z_x \pm Zsp/\text{vertical synchronizing frequency} \quad (7)$$

In this expression, pps represents a unit for a rotation speed of a stepping motor used as the zoom motor, specifically a step amount (1 step=1 pulse) of rotation per second. Signs + and − of the expression (7) respectively indicate a telephoto direction and a wide-angle direction corresponding to the moving direction of the zoom lens.

Then, at Step S407, the microcomputer determines a zoom area v' where the zoom lens position $Z'_x$ is located. At Step S407, the microcomputer performs similar to that shown in FIG. 6, specifically processing where $Z_x$ and v in FIG. 6 are respectively replaced by $Z'_x$ and v'.

At step S408, the microcomputer determines whether or not the zoom lens position $Z'_x$ after one vertical synchronizing time period is located on the boundary of the zoom area. In the case of the boundary flag=0, the microcomputer determines that the zoom lens position $Z'_x$ is not located on the boundary, and then proceeds to Step S409 and subsequent steps thereof.

At Step S409, the microcomputer sets $Z_x \leftarrow Z_{(v')}$, $Z_{k-1} \leftarrow Z_{(v', -1)}$. At Step S410, the microcomputer reads four table data $A_{(\gamma, v'-1)}$, $A_{(\gamma, v')}$, $A_{(\gamma+1, v')}$ and $A_{(\gamma+1, v')}$ where an object distance $\gamma$ is specified by processing of FIG. 5. At Step S411, the microcomputer calculate $a'_x$ and $b'_x$ by the expressions (2) and (3).

On the other hand, if the microcomputer determines "Yes" at Step S408, the microcomputer at Step S412 loads an in-focus position $A_{(\gamma, v')}$ corresponding to the zoom area v' at the object distance $\gamma$ and an in-focus position $A_{(\gamma+1, v')}$ corresponding to the zoom area v' at the object distance $\gamma+1$. Then, the microcomputer stores these in-focus positions as $a'_x$ and $b'_x$ in the memory.

Next at Step S413, the microcomputer calculates an in-focus position (target position) $P'_x$ of the minute movement center focus lens when the zoom lens position reaches $Z'_x$. By using the expression (1), a tracking target position after one vertical synchronizing period of time can be represented by the following expression (8):

$$P'_x = (b'_x - a'_x) \times \alpha/\beta + a'_x \qquad (8)$$

Next at Steps S414 to S417, the microcomputer performs sign determination of an amplitude L based on a minute movement count N. As shown in FIG. 17A, the minute movement is synchronized with the minute movement count N. At Step S414, when the minute movement count N is one of 0, 1, 4 and 5, the focus lens is moved further on the infinite side than the center cam track of the minute movement, and hence the microcomputer subtracts the amplitude L from the minute movement center focus lens position. As a result, at Step S415, a focus lens position $P'_L$ ahead by 1V becomes $P'_x - L$.

Figure 19A:
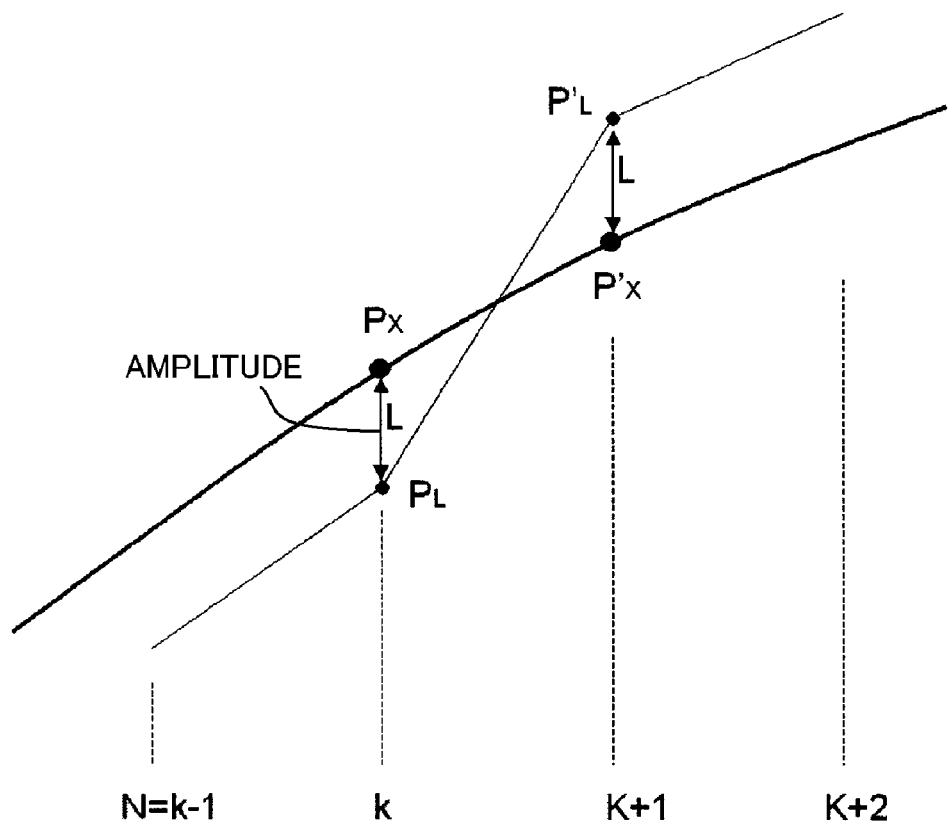
FIGS. 19A and 19B show the minute movement of the focus lens and the movement of the center position in the embodiment.

Similarly, at Step S414, when the minute movement count N is one of 2, 3, 6 and 7, the focus lens is moved further on the close side than the minute movement center cam track, the microcomputer adds the amplitude L to the minute movement center focus lens position. Thus, at Step S416, the focus lens position $P'_L$ ahead by 1V becomes $P'_x + L$. FIG. 19A shows the minute movement of the focus lens from the infinite side to the close side. The amplitude L is determined by a depth of focus or the like.

Next at Step S417, the microcomputer increments the minute movement count N. Then at Step S418, when the minute movement count N reaches 8, the microcomputer initializes the minute movement count N to 0. A maximum value of the minute movement count N is not necessarily 8. In this embodiment, four minute movements in the infinite direction, the infinite direction, the close direction and the close direction constitute one cycle. However, one cycle may be constituted by alternate two movements in the infinite direction and the close direction.

The above processing enables calculation of the focus lens position $P'_L$ ahead by 1V. After the completion of this processing, at Step S706 of FIG. 7, the microcomputer selects moving directions and speeds of the focus lens and the zoom lens according to an operation mode.

Figure 19B:
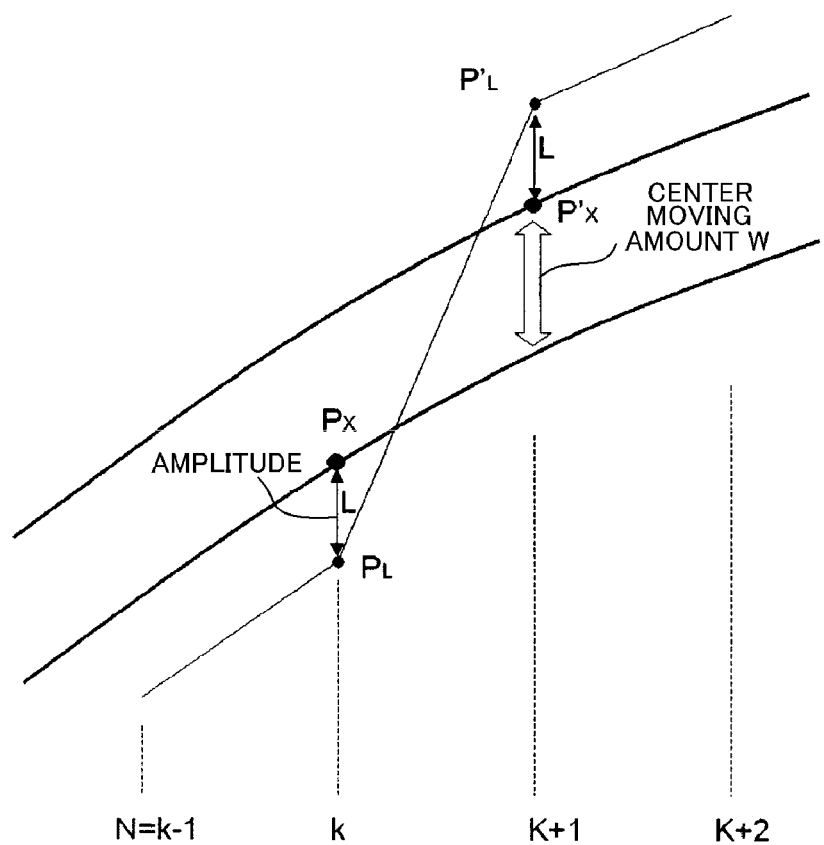

As shown in FIG. 19B, in the case of a zooming operation with a center movement amount W, a difference $\Delta F$ between a value of the focus lens position $P'_L$ ahead by 1V and the current focus lens position $P_L$ (point away by L from the minute movement center position $P_x$) obtained at Step S415 or S416 is represented as follows:

$$\Delta F = P'_L - P_L$$

$$\Delta F = \{(b'_x - a'_x) \times \alpha/\beta + a'_x \pm L\} - (P_x \pm L) \pm W$$

The sign of L is set based on the minute movement count N, and the center movement amount W is calculated based on a comparison result of the AF evaluation values.

Thus, depending on whether the difference $\Delta F$ is positive or negative, a direction for moving the focus lens is selected from one of the close direction and the infinite direction. As a result, the minute movement of the focus lens enables determination of a cam track to be traced.

The presupposed technology of the present invention has been described. Hereinafter, differences of an embodiment of the present invention from the presupposed technology will be described.

Embodiment

Figure 1:
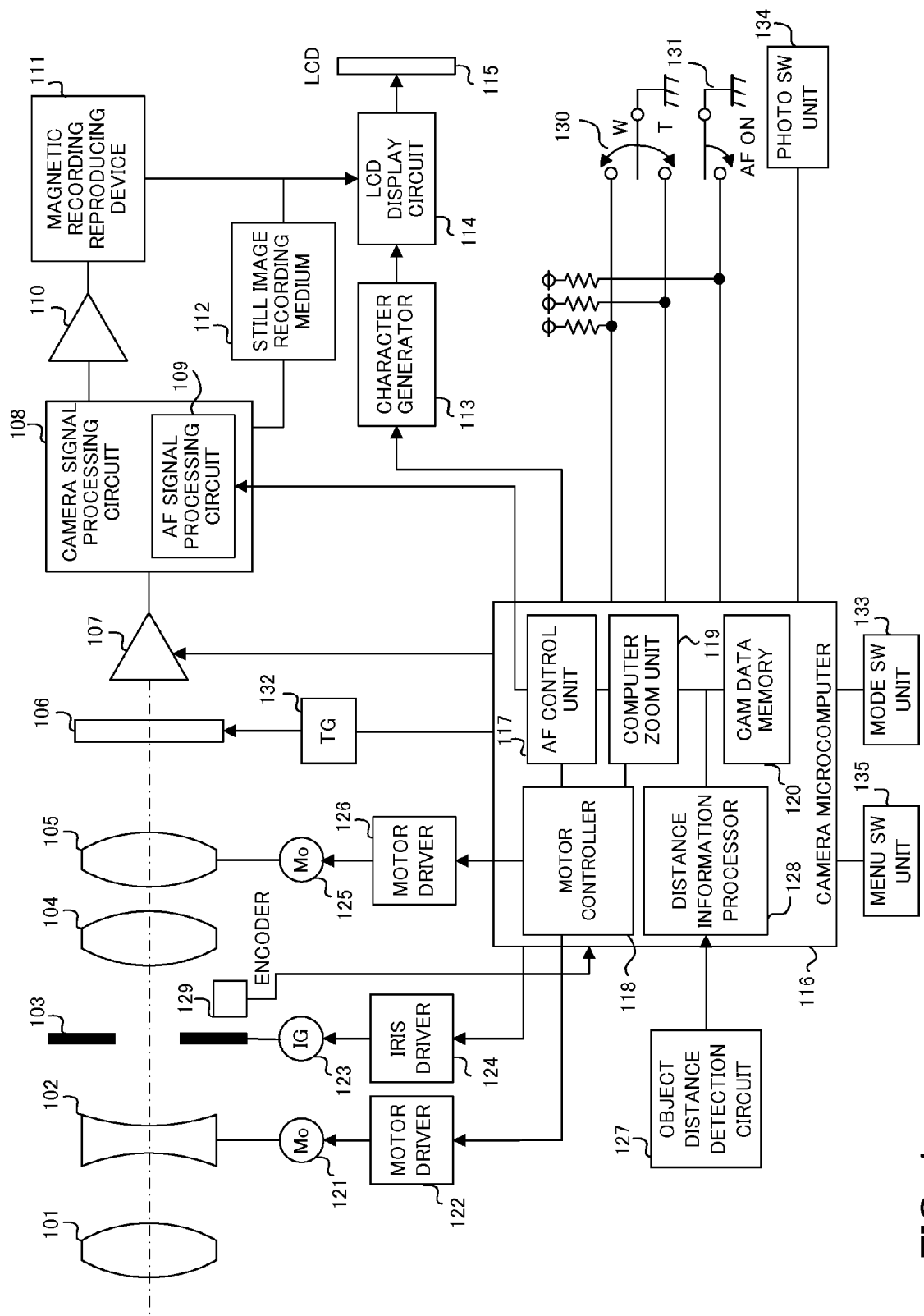
FIG. 1 is a block diagram showing a configuration of a video camera that is an embodiment of the present invention.

FIG. 1 shows a configuration of a video camera as an image pickup apparatus (optical apparatus) including a lens control apparatus that is an embodiment of the present invention mounted thereon. This embodiment will describe an example where the present invention is applied to a lens-integrated image pickup apparatus. However, alternative embodiments of the present invention include an interchangeable lens (optical device) of an image pickup system including the interchangeable lens and a camera body to which the interchangeable lens is mounted.

In this case, a microcomputer in the interchangeable lens performs a zoom operation described below in response to a signal transmitted from the camera body. The alternative embodiments of the present invention further include not only the video camera but also various other image pickup apparatuses such as a digital still camera.

In FIG. 1, in order from an object side (left in the figure), reference numeral 101 denotes a front lens unit, and reference numeral 102 denotes a zoom lens unit (first lens unit, and hereinafter referred to as "zoom lens") which is moved in an optical axis direction to perform zooming (variation of magnification). Reference numeral 103 denotes an aperture stop as a light amount adjuster, and reference numeral 104 denotes a fixed lens unit. Reference numeral 105 denotes a focus lens unit (second lens unit, hereinafter referred to as "focus lens") which has a focusing function and a compensating function of correcting image plane variation due to zooming.

The lens units 101, 102, 104 and 105 and the aperture stop 103 constitute an image taking optical system. The image taking optical system is a rear focus (inner focus) optical system including four lens units having positive, negative, positive and positive optical powers in order from the object side. In the figure, each lens unit includes one lens. In reality, however, each lens unit may include plural lenses.

Reference numeral 106 denotes an image pickup element such as a CCD sensor or a CMOS sensor. A light flux from an object passed through the image taking optical system forms an image on the image pickup element 106. The image pickup element 106 photoelectrically converts the object image to output an image pickup signal (photoelectric conversion signal). The image pickup signal is amplified to an optimal level by an amplifier (AGC) 107 to be input to a camera signal processing circuit 108.

The camera signal processing circuit 108 converts the input image pickup signal into a standard television signal (video signal) to output the signal to an amplifier 110. The television signal amplified to an optimal level by the amplifier 110 is output to a magnetic recording/reproducing device 111 to be recorded in a magnetic recording medium such as a magnetic tape. As the recording medium, other media such as a semiconductor memory and an optical disk may be used.

The television signal amplified by the amplifier 110 is transmitted to an LCD display circuit 114 to be displayed as a captured image by an LCD 115. The LCD 115 also displays an image to notify a user of an image pickup mode, an image pickup state and various warnings. Such an image is generated by a character generator 113 controlled by a camera microcomputer 116, and is mixed to the television signal by the LCD display circuit 114, thereby being superimposed on the captured image and displayed therewith.

The image pickup signal input to the camera signal processing circuit 108 can be simultaneously compressed by using an internal memory, and then recorded in a still image recording medium 112 such as a card medium.

The image pickup signal input to the camera signal processing circuit 108 is also input to an AF signal processing circuit 109 as a focus signal generator. An AF evaluation value signal (focus signal) generated by the AF signal processing circuit 109 and indicating a focus state of the image taking optical system is read by communication with the camera microcomputer 116.

The camera microcomputer 116 reads states of a zoom switch 130 and an AF switch 131, and detects a state of a photo switch 134.

In a state where the photo switch 134 is half-pressed, a focusing operation by AF is started, and focus lock is activated in an in-focus state. In a state where the photo switch 134 is fully pressed, the focus lock is performed irrespective of an in-focus or out-of focus state to capture an image in a memory (not shown) of the camera signal processing circuit 108, and a still image is recorded in a magnetic tape or the still image recording medium 112.

The camera microcomputer 116 determines whether a current image pickup mode is a moving image pickup mode or a still image pickup mode according to a state of a mode switch 133, and controls the magnetic recording/reproducing device 111 and the still image recording medium 112 via the camera signal processing circuit 108. The camera microcomputer 116 accordingly supplies a television signal suited to recording. When the mode switch 133 is set in a reproduction mode, the camera microcomputer 116 controls reproduction of the television signals recorded in the magnetic recording/reproducing device 111 and the still image recording medium 112.

The camera microcomputer 116 includes a computer zoom unit 119 provided as a controller. When the zoom switch 130 is operated while the AF switch 131 is OFF, the computer zoom unit 119 outputs a zoom signal to a zoom motor driver 122 via a motor controller 118 according to an internal program. The zoom signal is for moving the zoom lens 102 in a telephoto direction or a wide-angle direction corresponding to a direction where the zoom switch 130 is operated.

The zoom motor driver 122 moves the zoom lens 102 via a zoom motor 121 in response to reception of the zoom signal in a direction corresponding to the operation direction of the zoom switch 130.

A cam data memory (memory) 120 stores representative cam track data shown in FIG. 11 or data of cam track parameters, which are created in advance for each in-focus distance. The computer zoom unit 119 generates cam track data (cam track information) based on the stored data. The computer zoom unit 119 drives a focus motor 125 via a focus motor driver 126 based on the cam track data, and moves the focus lens 105 so as to correct the image plane variation accompanying zooming.

The camera microcomputer 116 includes an AF control unit 117.

When the AF switch 131 is ON and the zoom switch 130 is operated, zooming needs to be performed while maintaining an in-focus state. In this case, the computer zoom unit 119 obtains the AF evaluation value signal from the AF signal processing circuit 109 and distance information to an object (focusing target object) from an object distance detection circuit (detector) 127. Then, the computer zoom unit 119 moves the zoom lens 102 and the focus lens 105 based on the cam track data, the AF evaluation value signal and the distance information.

A detection signal (information corresponding to distance) from the object distance detection circuit 127 is subjected to calculation processing by a distance information processor 128 of the camera microcomputer 116, and is output as the distance information to the computer zoom unit 119.

When the zoom switch 130 is not operated while the AF switch 131 is ON, the AF control unit 117 outputs a signal to the focus motor driver 126 via the motor controller 118 so as to move the focus lens 105 such that a level of the AF evaluation value signal becomes a maximum. Thus, the focus lens 105 is moved via the focus motor 125 to perform an autofocus operation.

The object distance detection circuit 127 measures a distance to the object by a triangulation method using an active sensor, and outputs the distance information which is a measuring result. In this case, as the active sensor, an infrared sensor which is often used in a compact camera can be used.

This embodiment describes an example where distance detection is performed by the triangulation method. However, other distance detection methods can be employed. For example, a TTL phase difference detection method can be employed in which a signal (phase difference signal as information corresponding to distance) corresponding to the object distance is obtained.

In this case, an element such as a half-prism or a half-mirror for dividing a light flux that has passed through an exit pupil of the image taking optical system is provided, and the light flux emerging from the element is guided to at least two line sensors via a sub-mirror or an image-forming mirror. Then, correlation calculation is performed on outputs of these line sensors, thereby obtaining a deviation direction and a deviation amount of the outputs. An object distance is obtained from the deviation direction and amount.

Figure 14:
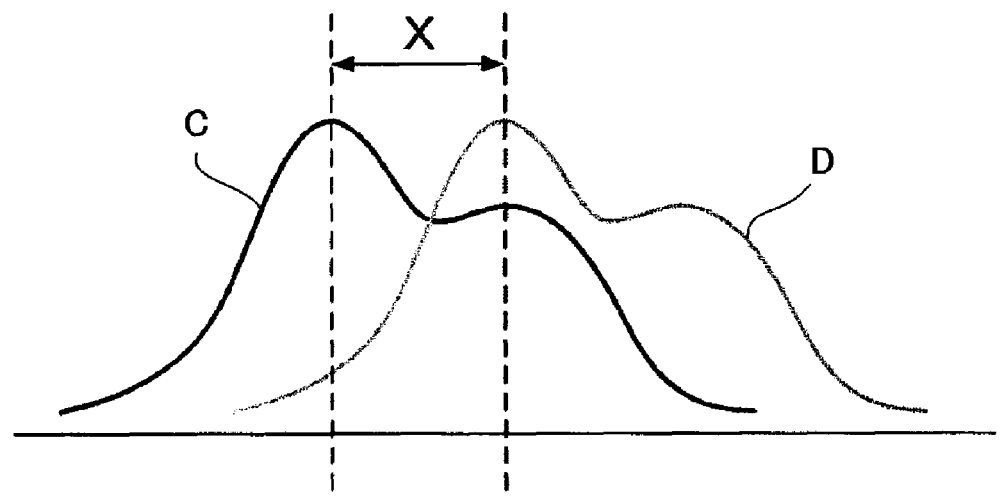
FIG. 14 shows a ranging method using a phase difference detection method.

FIGS. 13 and 14 show a principle of distance calculation performed by the triangulation method or the phase difference detection method. In FIG. 13, reference numeral 201 denotes an object, reference numeral 202 denotes an image-forming lens for a first optical path, and reference numeral 203 denotes a line sensor for the first optical path. Reference numeral 204 denotes an image-forming lens for a second optical path, and reference numeral 205 denotes a line sensor for the second optical path. The line sensors 203 and 205 are disposed away from each other by a base length B.

Of light fluxes from the object 201, a light flux passing through the first optical path forms an image on the line sensor 203 by the image-forming lens 202, and a light flux passing through the second optical path forms an image on the line sensor 205 by the image forming lens 204.

FIG. 14 shows an example of signals (object image signals) C and D read from the line sensors 203 and 205 received the two object images formed by the light fluxes passing through the first and second optical paths.

The two line sensors are separated from each other by the base length B. Hence, as obvious from FIG. 13, the object image signals C and D are deviated from each other by the number of pixels X. Thus, a correlation between the two object image signals C and D is calculated by shifting pixels, and a pixel shift amount to maximize the correlation is obtained, thereby enabling calculation of X. From this X, the base length B, and a focal length f of each of the image forming lenses 202 and 204, a distance L to the object can be obtained by L=B×f/X, which is the principle of the triangulation method.

For the detector, a method of obtaining a signal equivalent to a distance to the object by measuring a propagation speed using an ultrasonic sensor can be used.

The distance information from the object distance detection circuit 127 is transmitted to the distance information processor 128. The distance information processor 128 performs the following three processes PROCESS 1 to PROCESS 3.

(PROCESS 1) The distance information processor 128 calculates, of the cam tracks for various object distances shown in FIG. 9, a cam track on which the zoom lens 102 and the focus lens 105 are currently located. The cam track can be calculated, for example, as described at Step S405 of FIG. 4.

Specifically, the distance information processor 128 calculates an object distance (meters) corresponding to a virtual cam track which internally divides a γ column cam track and a γ+1 column cam track at a internal division ratio of α/β by using the current lens positions and the cam track parameters α, β and γ. The cam track parameters α, β and γ are converted into the object distance by using predetermined correlation table data. Thus, a real distance to the object can be obtained.

(PROCESS 2) The distance information processor 128 performs reverse conversion of the distance to the object obtained from the object distance detection circuit 127 by using the correlation table data described above in PROCESS 1 to obtain a cam track expressed by the cam track parameters α, β and γ. In the reverse conversion, of the correlation table data, wide-angle side data where the cam tracks of FIG. 9 are converged are not used, but telephoto side data where the cam tracks are dispersed are used. Thus, high resolution cam track parameters (cam tracks) can be obtained.

(PROCESS 3) A difference between the real distance to the object obtained in PROCESS 1 and the distance to the object obtained from the object distance detection circuit 127 in PROCESS 2, and a direction thereof are calculated.

Among these PROCESSES 1, 2 and 3, PROCESS 2 enables determination of a cam track corresponding to the distance information detected by the object distance detection circuit 127.

The camera microcomputer 116 also performs exposure control. The camera microcomputer 116 refers to a luminance level of the television signal generated by the camera signal processing circuit 108, and controls an iris driver 124 to drive an IG meter 123 so that the luminance level can be appropriate for exposure. Thus, the camera microcomputer 116 controls an aperture diameter (aperture amount or aperture value) of the aperture stop 103.

The aperture diameter of the aperture stop 103 is detected by an iris encoder 129 to perform feedback control of the aperture stop 103. When appropriate exposure control cannot be performed only by the aperture stop 103, an exposure time period of the image pickup element 106 is controlled by a timing generator (TG) 132 to perform a fast shutter and a slow shutter which is called as long-time exposure. When there is a shortage of exposure due to image pickup under low illuminance or the like, the camera microcomputer 116 controls a gain of the television signal via the amplifier 107.

The user can manually set an image pickup mode and a camera function which are suited to each of various image pickup conditions.

Next, referring to FIG. 3, an algorithm during zooming will be described. In this embodiment, the computer zoom unit 119 included in the camera microcomputer 116 executes the aforementioned processing and the following processing according to computer programs.

In this embodiment, based on the distance information obtained by the object distance detection circuit 127, a cam track to be traced (followed) by the focus lens 105 is determined (generated), and thereby zooming is performed while maintaining an in-focus state.

FIG. 3 shows an example of a method for performing a zooming operation while determining (generating) a zoom tracking curve that is a cam track to be followed by using the distance information. This method is especially effective in a case where a cycle of sampling of the AF evaluation value signals is coarse during superfast zooming or the like, and therefore accuracy of determining the zoom tracking curve cannot be sufficiently increased only by the AF evaluation value signals that are reference signals of TV-AF.

FIG. 3 shows the aforementioned processing performed at Step S705 of FIG. 7 in this embodiment. Processing (step) similar to that of FIG. 4 is denoted by a same reference numeral to omit its description. In FIG. 3, portions where same circled numerals are added are connected to each other.

At Step S400, the computer zoom unit 119 determines a moving speed (hereinafter referred to as "zooming speed") of the zoom lens 102 during zooming.

At Step S300, the computer zoom unit 119 calculates cam track parameters αd, βd and γd corresponding to the distance information obtained by the object distance detection circuit 127, for example, by the following method.

First, in order to obtain a correlation between the distance information and the representative cam tracks shown in FIG. 9, table data of a correlation between a change of the distance information and the cam track parameters are created in a range where the cam tracks (cam curves) for the representative object distances have a uniform shape. The table data enables calculation of the cam track parameters by inputting the distance information. For an object distance where the shape of the cam track changes, a look-up table representing another correlation is provided. Providing a plurality of such look-up tables enables obtaining of the cam track parameters for all the object distances.

Concerning a focal length, of the cam track data shown in FIG. 9 discretely stored in the memory, cam track parameters on a long focal length side where resolution of the cam track parameters α, β and γ is highest are permitted to be output. This makes it possible to extract, according to the distance information, cam track parameters from a telephoto side point where the cam tracks are dispersed as shown in FIG. 9, even when the current lens position is located in a wide-angle side area where the cam tracks are converged.

Accordingly, at a point of time when the zoom lens 102 is located on the wide-angle side, interpolation calculation is performed based on the cam track parameters on the telephoto side, whereby one cam track to be traced by the focus lens 105 can be determined.

Step S300 is executed for each predetermined cycle (e.g., one vertical synchronizing cycle). Thus, even when the object distance changes during zooming, based on the distance information from the object distance detection circuit 127, latest cam tracks to be traced by the focus lens 105 are sequentially updated.

At Step S301, the computer zoom unit 119 determines a correction range of the cam tracks based on the cam track parameters αd, βd and γd corresponding to the distance information obtained by the object distance detection circuit 127. This correction range corresponds to a movable range of the focus lens 105 during a correction operation of the cam tracks using the AF evaluation values, in other words, a movable range for the minute movement of the focus lens 105 performed to obtain the AF evaluation values, for example, a range between an upper limit 201 and a lower limit 202 shown in FIG. 2.

In this embodiment, for example, when the distance information (object distance) 203 obtained by the object distance detection circuit 127 is 5 m, the correction range is restricted within an increase/decrease range of ±50 cm with respect to the object distance. In other words, the upper limit 201 is equivalent to a cam track corresponding to an object distance of 4.5 m, and the lower limit 202 is equivalent to a cam track corresponding to an object distance of 5.5 m. This increase/decrease range may be determined according to detection accuracy of the object distance detection circuit 127.

In this embodiment, after a cam track to be followed (hereinafter referred to as "following cam track") is roughly determined based on the distance information, the following cam track is redetermined (regenerated) more accurately by the minute movement of the focus lens 105 performed to obtain the AF evaluation values. The correction range is set to restrict a movable range of the focus lens 105 during the minute movement.

Employing such a configuration eliminates necessity of setting detection resolution (detection accuracy) of the object distance detection circuit 127 so high, accordingly enabling realization of a low-cost and compact optical apparatus.

Conventionally, an object distance has been undeterminable during zooming from the wide-angle side to the telephoto side. As a result, a center position (movement center) of the minute movement of the focus lens is greatly moved during the zooming to determine a following cam track among many cam tracks, creating a possibility of defocusing (image blur).

On the other hand, in this embodiment, the correction range is set, and a following cam track is determined among a small number of cam tracks restricted within the correction range. Thus, the movement amount of the center position (center movement amount) of the focus lens in the minute movement is small, enabling suppression of defocusing.

The small center movement amount of the focus lens provides an advantage of reducing a moving speed of the focus lens.

As shown in FIG. 9, inclination of the cam tracks is steeper on the telephoto side than on the wide-angle side. Hence, when the focus lens is moved to trace the cam track, the moving speed of the focus lens at the vertical synchronizing cycle increases as it moves toward the telephoto side. When a large center movement in the infinite direction is added thereto, the moving speed of the focus lens further increases. The increase in moving speed of the focus lens causes noise or a performance problem during driving of the focus lens.

On the other hand, restricting the correction range to reduce the center movement amount enables mitigation of such a problem.

Figure 2:
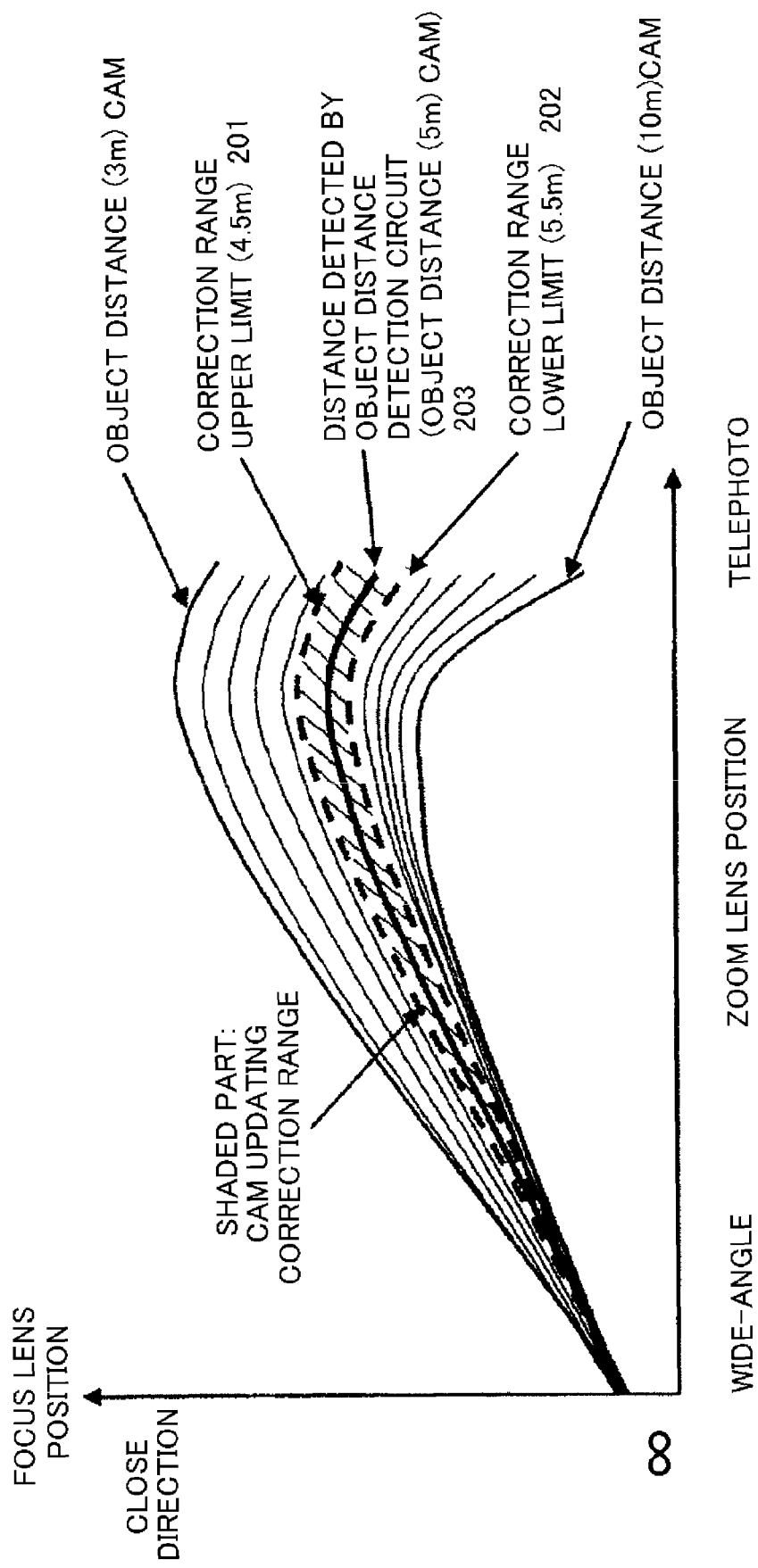
FIG. 2 is a conceptual diagram showing a correction range in a correction operation of a cam track according to the embodiment.

As a real operation in this embodiment, determination of the following cam track by the minute movement of the focus lens is performed only within the correction range between the upper limit 201 and the lower limit 202 shown in FIG. 2, and the center movement amount of the focus lens 105 is set so as not to exceed the correction range. This setting method is implemented at Steps S302 to S311 described below. As a result, redetermination of the following cam track outside the correction range between the upper limit 201 and the lower limit 202 is inhibited.

Thus, in this embodiment, the correction range is set according to the distance detection resolution of the object distance detection circuit 127, and accurate determination of the following cam track is performed using the AF evaluation values obtained only within the correction range. As a result, erroneous operations or defocusing caused by use of the AF evaluation values to redetermine the following cam track can be suppressed.

Referring back to FIG. 3, at Step S401, as in the case of Step S401 of FIG. 4, the computer zoom unit 119 compares the AF evaluation values of the close side and the infinite side of the center cam track obtained by the minute movement of the focus lens 105 with each other to determine a direction of the center movement.

At Step S402, the computer zoom unit 119 determines a necessity of the center movement based on the result of Step S401, and starts calculation of the center movement amount from step S302 if the center movement is necessary. If the center movement needs to be performed, in other words, in an in-focus state, the computer zoom unit 119 proceeds to Step S405.

The calculation of the center movement amount implemented at Steps S302 to S311 will be described below in detail.

Determination of the following cam track during zooming can be performed, if the zooming is started from the wide-angle side, while suppressing defocusing more on the wide-angle side than on the telephoto side. A reason is as follows.

All the cam tracks are densely set on the wide angle side. Hence, even when any of the cam tracks on the infinite side and the close side is selected as the following cam track, all the cam tracks can be covered by a small center movement. Additionally, a depth of focus (distance range where defocusing cannot be recognized by human eyes) is larger (deeper) on the wide-angle side, and thus the following cam track can be determined while suppressing defocusing.

However, an angle of view is wider on the wide-angle side, and hence various objects enter an AF target angle of view, and detection of a distance to a main object that is a focusing target object is difficult. As a result, there is a problem of a difficulty of determining the following cam track.

On the telephoto side, the cam tracks are away from one another. Hence, in order to determine one following cam track from the plural cam tracks, the center movement amount needs to be set larger than that on the wide-angle side. However, due to a small depth of focus on the telephoto side, the large center movement amount causes a difficulty of determining the following cam track while suppressing defocusing. On the other hand, the angle of view on the telephoto side is narrower than that on the wide-angle side, and hence the distance to the main object can be easily obtained, which facilitates determination of the following cam track.

In other words, the wide-angle side has characteristics that the determination of the following cam track is difficult while defocusing hardly occurs. The telephoto side has characteristics that the determination of the following cam track is easy while defocusing easily occurs.

For such characteristics, the depth of focus is an important factor. The depth of focus is determined based on the aperture diameter (aperture amount) of the aperture stop 103. When the aperture diameter of the aperture stop 103 is large, the depth of focus is small. In other words, defocusing easily Occurs. Conversely, when the aperture diameter is small, the depth of focus is large, and defocusing is difficult to occur.

Thus, in this embodiment, according to the aperture diameter (depth of focus) of the aperture stop 103, the center movement amount that is a movement amount of the movement center (center position) in the minute movement of the focus lens 105 during zooming is changed, thereby facilitating determination of the following cam track while suppressing defocusing. The aperture diameter of the aperture stop 103 and the depth of focus are information on an operation or a state of the image taking optical system.

Figure 20:
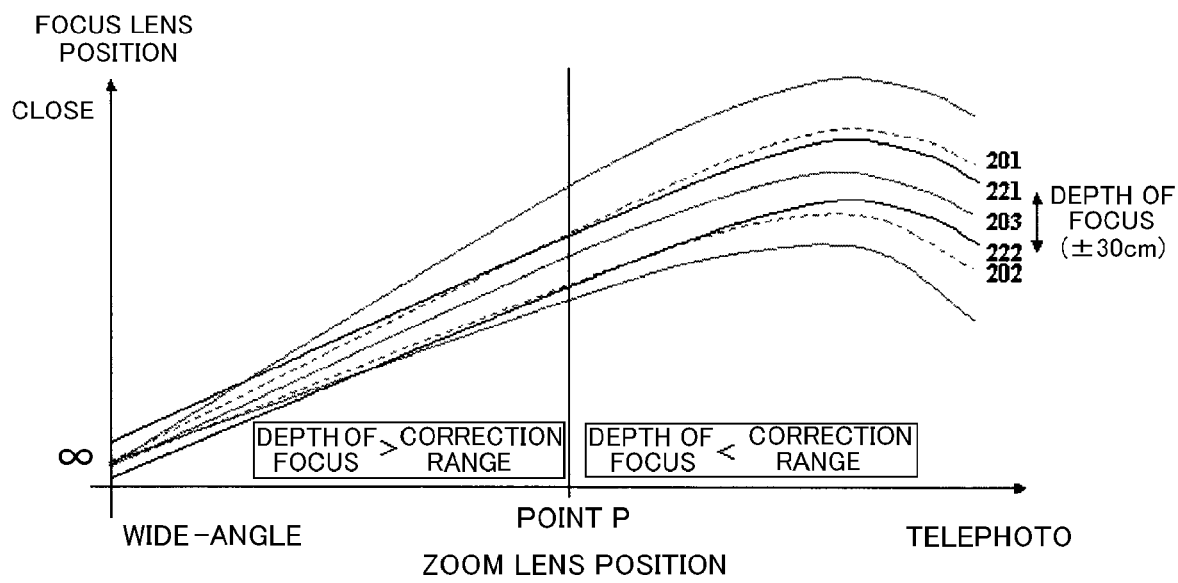
FIG. 20 shows a relationship between a correction range and a depth of focus in the embodiment.

FIG. 20 shows a relationship between the distance detection resolution of the object distance detection circuit 127 and the correction range in this embodiment. As described above, when the object distance obtained by the object distance detection circuit 127 is 5 m, the correction range is restricted within the range of ±50 cm of the object distance. In other words, the upper limit 201 is equivalent to a cam track for an object distance of 4.5 m, and the lower limit 202 is equivalent to a cam track for an object distance of 5.5 m.

When the depth of focus is superimposed thereon, the range of the depth of focus is a range surrounded with an upper limit side curved line 221 and a lower limit side curved line 222. For example, a wide-angle side depth of field (the depth of field is a value obtained by converting the depth of focus into an object distance) is ±1 m around 5 m, a telephoto side depth of field is ±30 cm, which is smaller than the wide-angle side depth of field, and a range of the depth of field (that is, a range of the depth of focus) is smaller than the correction range.

As shown in FIG. 20, the correction range and the depth of focus have a point P where a size relationship thereof is reversed at a certain focal length (zoom lens position). This point P changes depending on the object distance and the aperture diameter. In a wide angle side range where "depth of focus>correction range" is set with the point P as a boundary, the large depth of focus prevents defocusing from being noticeable during zooming.

The use of the object distance detection circuit 127 can solve the above-described problem of presence of various objects in the AF target angle of view on the wide angle side. The object distance detection circuit 127 detects object distances at one or several points in the angle of view irrespective of a size of the angle of view, and hence the object distance detection circuit 127 can detect a distance to the main object even when the angle of view is wide.

In other words, in the wide-angle side range where "depth of focus>correction range" is set at the time of starting zooming, through use of the object distance detection circuit 127, a following cam track present within the correction range is determined by the minute movement of the focus lens 105 and cam track changing by the center movement. This processing is important for zooming in which defocusing is suppressed.

Next, referring back to Step S302 of FIG. 3, setting of a center movement amount W' in this case will be described. The center movement amount W' is determined based on a size relationship between the depth of focus and the correction range. The following cam track is present within the correction range between the upper limit 201 and the lower limit 202, and hence even when any cam track present within the correction range is a following cam track during zooming, the center movement amount W' is set so as to determine the following cam track during zooming. Thus, the center movement amount W' is set such that the minute movement can cover all the cam tracks from the infinite side to the close side within the correction range.

At Step S302, the computer zoom unit 119 obtains the aperture diameter (aperture value) from the aperture stop 103. At Step S303, the computer zoom unit 119 calculates the depth of focus based on the aperture value obtained at Step S302 and the zoom lens position.

At Step S304, the computer zoom unit 119 obtains a zooming speed Zsp and an exposure time period (shutter speed) of the image pickup element 106 determined by the timing generator (TG) 132.

At Step S305, the computer zoom unit 119 determines the size relationship of the depth of focus and the correction range. When the correction range is smaller than the depth of focus ("correction range<depth of focus"), the computer zoom unit 119 proceeds to Step S306 to calculates a zooming time period Tz (zooming time period in a range where "depth of focus>correction range" is established) to the point P where the depth of focus is equal to the correction range. The zooming time period can be calculated as follows:

Zooming time period $Tz[s]$=distance[pulse]÷zooming speed $Zsp[pps]$ to point $P$ At Step S307, the computer zoom unit 119 calculates a center movement frequency M during the zooming time period Tz. The center movement frequency M is proportional to the number of times of obtaining the AF evaluation values synchronized with the vertical synchronizing cycle V, and calculated by using the vertical synchronizing cycle V. In other words, the center movement frequency M can be calculated as follows:

Center moving frequency $M$=zooming time period $Tz[s]$×vertical synchronizing cycle $V[hz]$ The center movement frequency M corresponds to the number of times of obtaining the AF evaluation values.

Next, the computer zoom unit 119 calculates, by center movements performed M times during the zooming time period Tz, the center movement amount W' that enables the minute movement of the focus lens 105 within the correction range from the lower limit 202 to the upper limit 201. This center movement amount W' can be calculated by dividing the correction range by the center movement frequency M.

First at Step S308, the computer zoom unit 119 adds an error K to the center movement frequency M by taking some errors into consideration to calculate the following C:

$C=M-K$ ($K$ is an integer of 1 or more)

The above calculation presumes an image pickup condition where the object distance is not changed.

Next at Step S309, the computer zoom unit 119 calculates one center movement amount W' as follows:

Center moving amount $W'$=correction range/$C$

When the shutter speed is lower than the vertical synchronizing cycle V[hz], the center movement frequency M is calculated as follows:

Center moving frequency $M$=zooming time period $Tz[s]$÷shutter speed $[s]$

The center movement amount W' may be changed according to the focal length (zoom lens position) in addition to the zooming speed and the shutter speed (exposure time period of the image pickup element 106). The zooming speed and the focal length are information on an operation or a state of the image taking optical system. The shutter speed is information on a photoelectric conversion operation of the optical image.

Next, referring to FIG. 20, a range where the depth of focus is smaller than the correction range ("depth of focus<correction range") on the telephoto side from the point P will be described. Within this range, even within the correction range, only one erroneous center movement may cause defocusing. Thus, within this range, the center movement amount W' is set small to fine-correct the following cam track determined on the wide-angle side, thereby suppressing defocusing even when the erroneous center movement is performed. The center movement amount W' accordingly needs to be set smaller than the depth of focus.

Referring back to Step S305 of FIG. 3, setting of the center movement amount W' within this range will be described. At Step S305, the computer zoom unit 119 determines a relationship of "depth of focus<correction range". Then, the processing proceeds to Step S310.

At Step S310, the computer zoom unit 119 calculates the center movement amount W' as follows:

$$\text{Center moving amount } W' = \text{correction range}/C'$$

In the expression, C' denotes a value that satisfies a relationship of W'<depth of focus, and a value that is obtained by performing actual measurement by a sufficient number of times beforehand and where no defocusing occurs until completion of zooming is used.

After completion of the processing, at Step S311, the computer zoom unit 119 updates the minute movement position $P_x$ as follows by adding the center movement amount W' thereto:

$$\text{Minute movement position } P_x = P_x + W'$$

Next at Step S405, the computer zoom unit 119 calculates the cam track parameters corresponding to the center cam track of the minute movement. This processing is similar to that of Step S405 shown in FIG. 4. Processing of Step S405 and subsequent steps thereof is similar to that of FIG. 4.

As described above, in this exemplary embodiment, within the correction range (within moving range) for performing the minute movement of the focus lens which is a range restricted based on the object distance, the movement amount of the center position in the minute movement is changed according to the aperture value (in other words, to the depth of focus). As a result, defocusing can be suppressed while improving determination accuracy of the following cam track by using the AF evaluation values.

Changing the center movement amount according to the zooming speed, the focal length and the shutter speed enables further improvement of the determination accuracy of the following cam track.

Thus, according to this embodiment, the center movement amount is changed according to at least one of information on the operation or the state of the optical system and information on the photoelectric conversion operation of the optical image. Thus, completion of zooming without determining any following cam track due to a reduction in number of times of obtaining the AF evaluation values caused by the detection cycle of the AF evaluation values during a fast zooming operation or a slow shutter operation, or due to the characteristics of the cam tracks on the telephoto side can be prevented. Furthermore, zooming where defocusing caused by the minute movement of the focus lens for determining the following cam track is suppressed can be performed.

Furthermore, the present invention is not limited to these embodiments and various variations and modifications may be made without departing from the scope of the present invention.

This application claims the benefit of Japanese Patent Application No. 2009-005505, filed on Jan. 14, 2009, which is hereby incorporated by reference herein in its entirety.

What is claimed is:

1. A lens control apparatus configured to move a first lens unit for zooming and a second lens unit for focusing, the apparatus comprising:
   a focus signal generator configured to generate a focus signal indicating a contrast of an object image, wherein the object image is formed by an optical system, wherein the optical system includes the first lens unit, the second lens units, and a light amount adjuster, and wherein the light amount adjuster adjusts a light amount;
   a memory configured to store data generated for each predetermined in-focus distance and indicating a relationship between a position of the first lens unit and a position of the second lens unit;
   a detector configured to detect information corresponding to a degree of a defocus for a focusing target; and
   a controller configured to control, based on the data, movement of the second lens unit accompanying movement of the first lens unit,
   wherein the controller moves the second lens unit in an infinite direction and a close direction within a movable range set based on the information detected by the detector,
   wherein the controller changes a movement amount of a center position of the movement of the second lens unit in the infinite and close directions according to an aperture size of the light amount adjuster.

2. A lens control apparatus according to claim 1, wherein the controller changes the movement amount of the center position according to a depth of focus corresponding to the aperture size of the light amount adjuster.

3. A lens control apparatus according to claim 1, wherein the controller changes the movement amount of the center position according to an exposure time period of an image pickup element configured to photoelectrically convert the optical image formed by the optical system.

4. A lens control apparatus according to claim 1, wherein the controller changes the movement amount of the center position according to a moving speed of the first lens unit.

5. A lens control apparatus according to claim 1, wherein the controller changes the movement amount of the center position according to the position of the first lens unit.

6. An optical apparatus comprising:
   an optical system configured to include a first lens unit for zooming, a second lens unit for focusing, and a light amount adjuster for adjusting a light amount; and
   a lens control apparatus configured to move the first lens unit and the second lens unit,
   wherein the lens control apparatus comprises:
   a focus signal generator configured to generate a focus signal indicating a contrast of an object image formed by the optical system;
   a memory configured to store data generated for each predetermined in-focus distance and indicating a relationship between a position of the first lens unit and a position of the second lens unit; and
   a detector configured to detect information corresponding to a degree of a defocus for a focusing target, wherein the controller moves the second lens unit in an infinite direction and a close direction within a movable range set based on the information detected by the detector, and wherein the controller changes a movement amount of a center position of the movement of the second lens unit in the infinite and close direction according to an aperture size of the light amount adjuster.

7. A lens control method for moving a first lens unit for zooming and a second lens unit for focusing, the method comprising:

a focus signal generation step of generating a focus signal indicating a contrast of an object image formed by an optical system, wherein the optical system includes the first lens unit, the second lens units, and a light amount adjuster, and wherein the light amount adjuster adjusts a light amount;

a detection step of detecting information corresponding to a degree of a defocus for a focusing target; and a control step of controlling movement of the second lens unit accompanying movement of the first lens unit based on data generated for each predetermined in-focus distance and indicating a relationship between a position of the first lens unit and a position of the second lens unit, wherein the control step moves the second lens unit in an infinite direction and a close direction within a movable range set based on the information detected in the detection step, and wherein the control step changes a movement amount of a center position of the movement of the second lens unit in the infinite and close directions according to an aperture size of the light amount adjuster.

* * * * *